United States Patent
Kajiwara et al.

(10) Patent No.: US 11,975,560 B2
(45) Date of Patent: May 7, 2024

(54) BALLPOINT PEN TIP, BALLPOINT PEN REFILL, AND BALLPOINT PEN

(71) Applicant: KABUSHIKI KAISHA PILOT CORPORATION, Tokyo-to (JP)

(72) Inventors: Takumi Kajiwara, Tokyo-to (JP); Naoto Masushige, Tokyo-to (JP)

(73) Assignee: KABUSHIKI KAISHA PILOT CORPORATION, Tokyo-to (JP)

( * ) Notice: Subject to any disclaimer, the term of this patent is extended or adjusted under 35 U.S.C. 154(b) by 0 days.

(21) Appl. No.: 18/036,995

(22) PCT Filed: Nov. 15, 2021

(86) PCT No.: PCT/JP2021/041929
§ 371 (c)(1),
(2) Date: May 15, 2023

(87) PCT Pub. No.: WO2022/102776
PCT Pub. Date: May 19, 2022

(65) Prior Publication Data
US 2023/0398807 A1    Dec. 14, 2023

(30) Foreign Application Priority Data

Nov. 16, 2020  (JP) ................................. 2020-190522
Nov. 16, 2020  (JP) ................................. 2020-190525
(Continued)

(51) Int. Cl.
*B43K 1/08*       (2006.01)
*B43K 7/10*       (2006.01)

(52) U.S. Cl.
CPC .............. *B43K 1/084* (2013.01); *B43K 1/088* (2013.01); *B43K 7/10* (2013.01)

(58) Field of Classification Search
CPC ................................ B43K 1/084; B43K 1/086
See application file for complete search history.

(56) References Cited

U.S. PATENT DOCUMENTS 6,082,920 A  *  7/2000  Furukawa ............... B43K 1/084
                                                      401/209
6,805,511 B2 * 10/2004  Ando ....................... B43K 7/08
                                                      401/214
(Continued)

FOREIGN PATENT DOCUMENTS

JP     2002-52884     2/2002
JP     2011-240503    12/2011
(Continued)

OTHER PUBLICATIONS

International Preliminary Report on Patentability and Written Opinion of the International Searching Authority dated May 25, 2023 in corresponding International Application No. PCT/JP2021/041929.
(Continued)

*Primary Examiner* — David P Angwin
*Assistant Examiner* — Bradley S Oliver
(74) *Attorney, Agent, or Firm* — Wenderoth, Lind & Ponack, L.L.P.

(57) ABSTRACT

A ballpoint pen tip comprises: a ball having a diameter of 0.5 mm or less; and a tip body, wherein the tip body has a ball holding chamber, a rear hole, an ink flow hole, and an ink flow groove opening to the ball holding chamber, and not reaching the rear hole. A ratio of an ink consumption per 100 m of handwriting to a diameter of the ball is 200 mg/mm or more and 800 mg/mm or less, and when a front end of the ink flow groove is set as a start point and a position of 0.3 mm rearward from the front end of the ink flow hole is set as an end point, a volume of a first space in the ink flow hole and the ink flow groove from the start point to the end point is 0.02 mm$^3$ or more.

9 Claims, 9 Drawing Sheets

(30) Foreign Application Priority Data

Nov. 12, 2021 (JP) ................................. 2021-184770
Nov. 12, 2021 (JP) ................................. 2021-184782

(56) References Cited

U.S. PATENT DOCUMENTS

| | | | |
|---|---|---|---|
| 7,862,249 B2 * | 1/2011 | Ohashi | B43K 1/08 |
| | | | 401/209 |
| 8,430,591 B1 * | 4/2013 | Okamoto | B43K 1/084 |
| | | | 401/215 |
| 2012/0308290 A1 | 12/2012 | Ito | |

FOREIGN PATENT DOCUMENTS

| | | | | |
|---|---|---|---|---|
| JP | 2012-6315 | 1/2012 | | |
| JP | 2013-151153 | 8/2013 | | |
| JP | 2017-200748 | 11/2017 | | |
| JP | 2018-35334 | 3/2018 | | |
| WO | WO-2011024834 A1 * | 3/2011 | ............. | B43K 1/084 |
| WO | WO-2012086574 A1 * | 6/2012 | ............. | B43K 1/082 |
| WO | 2020/007653 | 1/2020 | | |

OTHER PUBLICATIONS

International Search Report dated Dec. 14, 2021 in corresponding International Application No. PCT/JP2021/041929.

\* cited by examiner

BALLPOINT PEN TIP, BALLPOINT PEN REFILL, AND BALLPOINT PEN

TECHNICAL FIELD

The present invention relates to a ballpoint pen tip, a ballpoint pen refill, and a ballpoint pen.

BACKGROUND ART

Conventionally, a ballpoint pen tip including a ball and a tip body for holding the ball has been used in a ballpoint pen.

JP2002-52884A discloses a ballpoint pen tip including a ball holding chamber for storing a ball, a rear hole located rearward of the ball holding chamber, an ink guide hole for allowing the ball holding chamber and the rear hole to communicate with each other, and an ink groove extending in a radial direction from the ink guide hole, and a ballpoint pen including the ballpoint pen tip.

In a conventional ballpoint pen, when the ballpoint pen is left for a long period of time without writing, an ink may be dried and solidified in a ball holding chamber. In this case, the ink is not appropriately supplied to the ball, and there have been problems that handwriting is blurred, writing cannot be performed at all, and the like. Therefore, it is desired to suppress drying of the ink in the ball holding chamber even when the ballpoint pen tip is left for a long period of time without writing or the like.

SUMMARY OF THE INVENTION

The present invention has been made in consideration of such points, and an object thereof is to suppress drying of an ink in a ballpoint pen tip.

A ballpoint pen tip according to the present invention includes:
a ball having a diameter of 0.5 mm or less; and a tip body that holds the ball,
the tip body has
a ball holding chamber that holds the ball,
a rear hole located rearward of the ball holding chamber,
an ink flow hole that allows the ball holding chamber and the rear hole to communicate with each other, and
an ink flow groove extending in a radial direction from the ink flow hole, opening to the ball holding chamber, and not reaching the rear hole,
when an ink consumption per 100 m of handwriting is A (mg) and the diameter of the ball is B (mm), a ratio (A/B) of the ink consumption A to the diameter B of the ball is 200 mg/mm or more and 800 mg/mm or less, and
when a front end of the ink flow groove is set as a start point and a position of 0.3 mm rearward from the front end of the ink flow hole is set as an end point, a volume of a space in the ink flow hole and the ink flow groove from the start point to the end point is 0.02 mm³ or more.

In the ballpoint pen tip according to the present invention, the volume of the space in the ink flow hole and the ink flow groove from the start point to the end point may be 1.5 times or more a volume of a space in the ball holding chamber from a tip end of the tip body to the start point.

In the ballpoint pen tip according to the present invention, an inner diameter of the ink flow hole may be 40% or more of the diameter of the ball.

In the ballpoint pen tip according to the present invention, a length of the ink flow hole may be 90% or less of the diameter of the ball.

In the ballpoint pen tip according to the present invention, a length of a region of the ink flow hole where the ink flow groove is not formed may be 90% or less of the diameter of the ball.

In the ballpoint pen tip according to the present invention, a resilient member having a spring portion and a rod portion extending forward from the spring portion and coming into contact with the ball from the rear may be further included.

In the ballpoint pen tip according to the present invention, a movable range of the ball in a front-rear direction with respect to the tip body may be 0.015 mm or more and 0.06 mm or less.

A ballpoint pen refill according to the present invention includes:
the ballpoint pen tip described above; and
an ink storage cylinder that stores an ink.

In the ballpoint pen refill according to the present invention,
the ink may be a thermochromic ink.

A ballpoint pen according to the present invention includes:
the ballpoint pen refill described above.

According to the present invention, drying of an ink in a ballpoint pen tip can be suppressed.

BEST MODE FOR CARRYING OUT THE INVENTION

Figure 1:
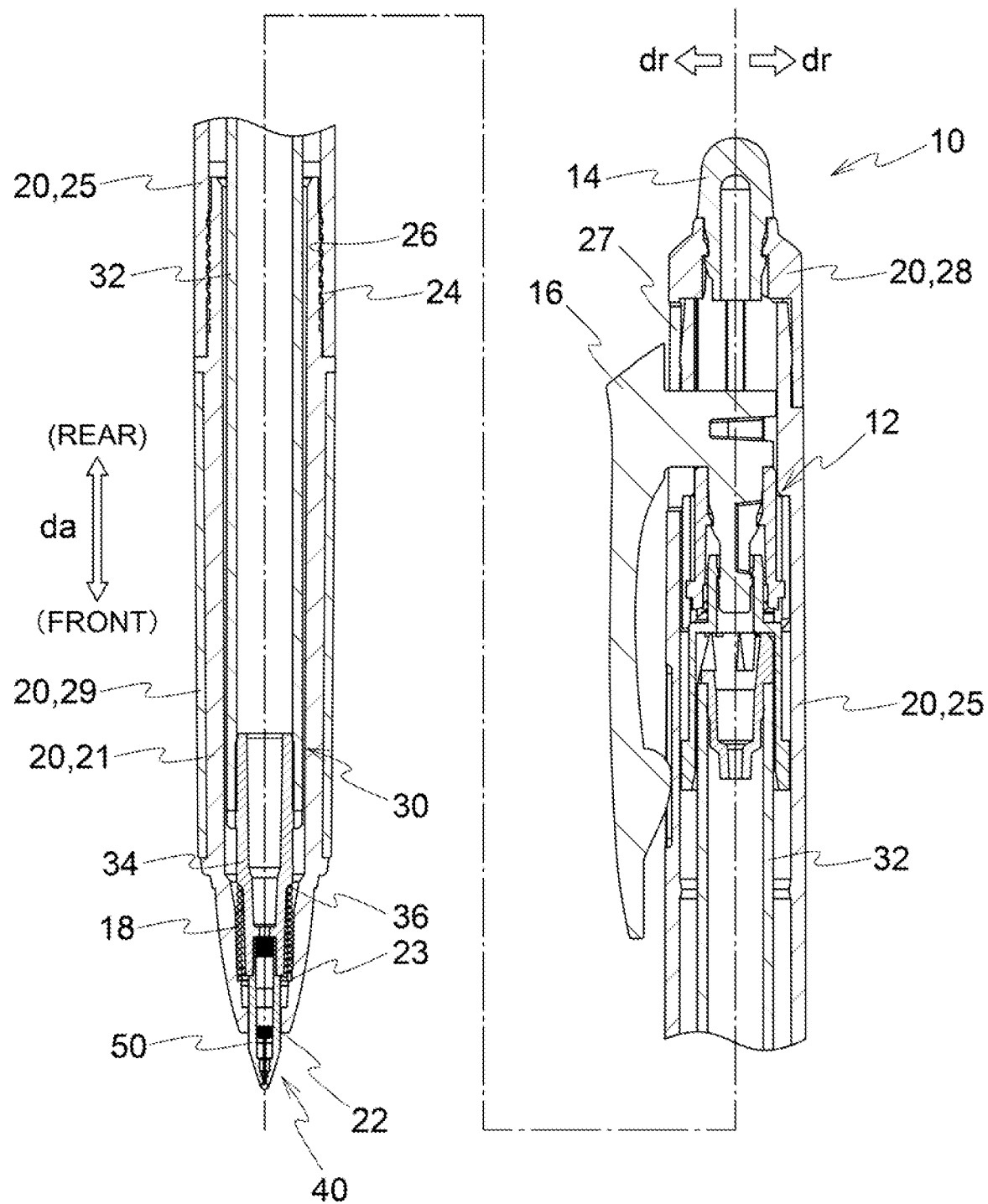
FIG. 1 is a view for describing a first embodiment of the present invention, and is a longitudinal sectional view illustrating an example of a ballpoint pen into which a ballpoint pen refill having a ballpoint pen tip is incorporated.

Hereinafter, embodiments of the present invention will be described with reference to the drawings. Note that, in the drawings attached to the present specification, for convenience of illustration and ease of understanding, scales, vertical and horizontal dimensional ratios, and the like are appropriately changed and exaggerated from the actual ones.

In addition, terms such as "parallel", "orthogonal", "same", and the like, values of length and angle, and the like, which specify shapes, geometric conditions, and degrees thereof, used in the present specification, are interpreted including a range in which similar functions can be expected without being bound by a strict meaning.

In the present specification, a direction in which a central axis A of a ballpoint pen 10 extends (longitudinal direction and vertical direction in a longitudinal sectional view) is set as an axial direction da, a direction orthogonal to the central axis A is set as a radial direction dr, and a direction along a circumference around the central axis A is set as a circumferential direction dc. In addition, along the axial direction da, a side close to a writing surface such as a paper surface at the time of writing is set as a front side, and a side away from the writing surface is set as a rear side. That is, a pen tip side is the front side, and a side opposite to the pen tip is the rear side.

First Embodiment

FIG. 1 is a view for describing a first embodiment of the present invention, and is a sectional view illustrating an example of a ballpoint pen 10. In the present embodiment, an example in which the ballpoint pen 10 is a so-called side knock type ballpoint pen will be described. The ballpoint pen 10 includes a barrel 20, a ballpoint pen refill 30 incorporated in the barrel 20, an advancing and retracting mechanism 12 for advancing and retracting a tip end of the ballpoint pen refill 30 from the barrel 20, a friction member 14 for rubbing handwriting, and a clip 16.

The barrel 20 includes a front barrel 21, a rear barrel 25 connected to the front barrel 21, a rear end cap 28 attached to a rear end portion of the rear barrel 25, and a grip member 29 disposed to surround an outer surface of the front barrel 21. The front barrel 21 is provided at a front end, and has an opening 22 through which a tip end portion of the ballpoint pen tip 40 of the ballpoint pen refill 30 can advance and retract, a first engagement portion 23 provided on an inner surface of a front region, and a male screw 24 provided on an outer surface of a rear region. The rear barrel 25 has a female screw 26 provided on the inner surface of the front region. By screwing the male screw 24 of the front barrel 21 and the female screw 26 of the rear barrel 25, the front barrel 21 and the rear barrel 25 are coupled to each other. The rear end cap 28 is fitted to the rear end portion of the rear barrel 25. The grip member 29 is intended to be gripped by a user's finger when the user writes with the ballpoint pen 10. The front barrel 21, the rear barrel 25, and the rear end cap 28 are made of, for example, a resin, and the grip member 29 is made of, for example, a rubber.

In the present embodiment, the clip 16 functions as an operation unit operated by the user at the time of knocking. The barrel 20 is provided with a slide hole 27 extending in the axial direction da and penetrating a wall portion of the barrel 20. The slide hole 27 is provided across the rear region of the rear barrel 25 and the front end portion of the rear end cap 28. In the illustrated example, the clip 16 extends from an inside of the barrel 20 to an outside of the barrel 20 through the slide hole 27. A movement range of the clip 16 in the axial direction da can be defined by the front end and the rear end of the slide hole 27.

The ballpoint pen refill 30 is accommodated in the barrel 20 to be advanced and retracted. The ballpoint pen refill 30 includes an ink storage cylinder 32 that stores an ink, a tip holder 34 disposed forward of the ink storage cylinder 32, and a ballpoint pen tip 40 disposed forward of the tip holder 34. In the example illustrated in FIG. 1, the rear end portion of the tip holder 34 is inserted into the front end portion of the ink storage cylinder 32, and the rear end portion of the ballpoint pen tip 40 is inserted into the front end portion of the tip holder 34. The ballpoint pen refill 30 has a second engagement portion 36 provided on an outer surface of the front region. In the illustrated example, the second engagement portion 36 is provided on an outer surface of the tip holder 34. In the assembled state of the ballpoint pen refill 30, the second engagement portion 36 of the ballpoint pen refill 30 is located rearward of the first engagement portion 23 of the front barrel 21, and a coil spring 18 is disposed in a compressed state between the first engagement portion 23 and the second engagement portion 36. As a result, the coil spring 18 biases the ballpoint pen refill 30 rearward.

As the ink, an ink that can be used for a ballpoint pen can be used without particular limitation. As an example, a thermochromic ink can be used as the ink. The thermochromic ink may be a reversibly thermochromic ink. As the reversibly thermochromic ink, for example, a heat-decoloring type reversibly thermochromic ink that changes from a coloring state to a decoloring state by heating and changes from a decoloring state to a coloring state by cooling can be used.

Specifically, general-purpose inks such as water-based gel inks having shear thinning, low-viscosity water-based inks, low-viscosity oily inks, high-viscosity oily inks, and emulsion inks can be applied depending on the type of ballpoint pen tip. Among them, water-based gel inks having shear thinning are particularly effective.

In addition, in the water-based gel ink having shear thinning, a coloring material is not particularly limited, and dyes, pigments, metallic luster tone pigments, fluorescent pigments, titanium oxide, thermochromic pigments, and the like can be used. In particular, when the ink contains a pigment solid content of 10 wt % or more, the ink is easily dried and solidified in the ballpoint pen tip, so that the effect of the present embodiment can be further exhibited. In addition, when titanium oxide or a thermochromic pigment requiring a pigment solid content of 10 wt % or more as a handwriting concentration is used as the ink, the effect of the present embodiment can be further exhibited.

In the water-based gel ink having shear thinning, the viscosity is preferably 1 to 2000 mPa·s, more preferably 3 to 1500 mPa·s, and still more preferably 500 to 1000 mPa·s when measured under a condition of a shear rate of 3.84 $\sec^{-1}$ in an environment of 20° C. In addition, the viscosity is preferably 1 to 200 mPa·s, more preferably 10 to 100 mPa·s, and still more preferably 20 to 50 mPa·s because ink dischargeability from the pen tip of the ballpoint pen can be improved when the measurement is performed under a condition of a shear rate of 384 $\sec^{-1}$ in the environment of 20° C.

The viscosity is a value measured by using a rheometer [manufactured by TA Instruments, product name: Discovery HR-2, cone plate (diameter 40 mm, angle 1°)] under the condition of the shear rate of 3.84 $\sec^{-1}$ or the shear rate of 384 $\sec^{-1}$ with the ink placed in the environment of 20° C.

When the water-based ballpoint pen is filled with an ink composition according to the present invention, the ball diameter (diameter) and the ink consumption preferably satisfy a specific relationship. Specifically, when the ink consumption per 100 m of a water-based ballpoint pen is A (mg) and the ball diameter is B (mm), the relationship is preferably set to $200 \leq A/B \leq 800$, and more preferably set to $300 \leq A/B \leq 700$. This is because by setting the ink consumption within an appropriate range with respect to the ball diameter, fluidity of the ink is improved, handwriting blur and the like are suppressed, and good handwriting is easily obtained.

The friction member 14 of the present embodiment is a member for rubbing the handwriting with the ink. When the ink is a thermochromic ink, the friction member 14 can be a friction member having a function of heating the ink forming the handwriting by frictional heat by rubbing the writing surface such as paper on which the handwriting is formed. In this case, the friction member 14 can be formed of, for example, an elastic material. The friction member 14 can be fixed to the rear end cap 28 by press fitting, engagement, screwing, fitting, bonding, two-color molding, or the like. In addition, when the ink is an ink having no thermochromic property, the friction member 14 may be, for example, a member that scrapes the handwriting by rubbing the writing surface such as paper on which the handwriting is formed, for example, a sand eraser.

The advancing and retracting mechanism 12 is a mechanism for alternately switching the ballpoint pen 10 between a knocked state in which the tip end portion of the ballpoint pen tip 40 protrudes from the opening 22 of the front barrel 21 and a non-knocked state in which the tip end portion of the ballpoint pen tip 40 is retracted from the opening 22. In FIG. 1, the ballpoint pen 10 is illustrated in the knocked state. In the non-knocked state, the ballpoint pen refill 30 is biased rearward by the resilient force of the coil spring 18, whereby the tip end portion of the ballpoint pen tip 40 is retracted from the opening 22. When the user pushes the clip 16 forward with the finger and slides the clip, the ballpoint pen refill 30 moves forward, and the tip end portion of the ballpoint pen tip 40 protrudes forward from the opening 22. Even when the user releases the finger from the clip 16, the ballpoint pen refill 30 maintains the state in which the tip end portion of the ballpoint pen tip 40 protrudes forward from the opening 22. When the user pushes the clip 16 forward again with the finger and slides the clip, the ballpoint pen refill 30 moves forward by a minute distance. When the user releases the finger from the clip 16 or loosens the forward pressing force on the clip 16, the ballpoint pen refill 30 is biased rearward by the resilient force of the coil spring 18, and the tip end portion of the ballpoint pen tip 40 is retracted from the opening 22. Since the advancing and retracting mechanism 12 that realizes such an advancing and retracting operation is known, a detailed description thereof will be omitted. As an example, as the advancing and retracting mechanism 12, an advancing and retracting mechanism disclosed in JP2012-6315A can be used.

Figure 2:
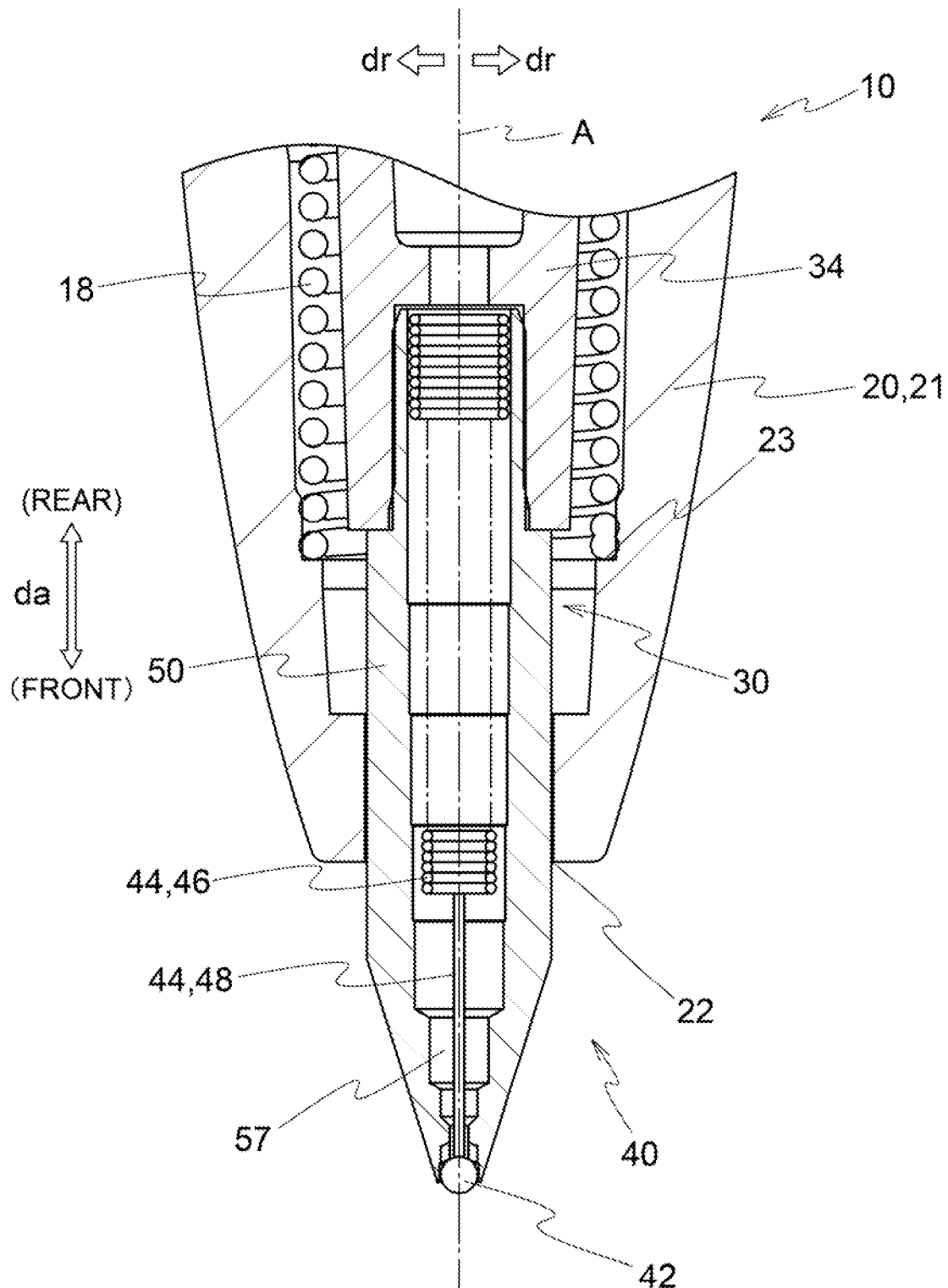
FIG. 2 is an enlarged longitudinal sectional view illustrating the ballpoint pen tip of FIG. 1.
Figure 3:
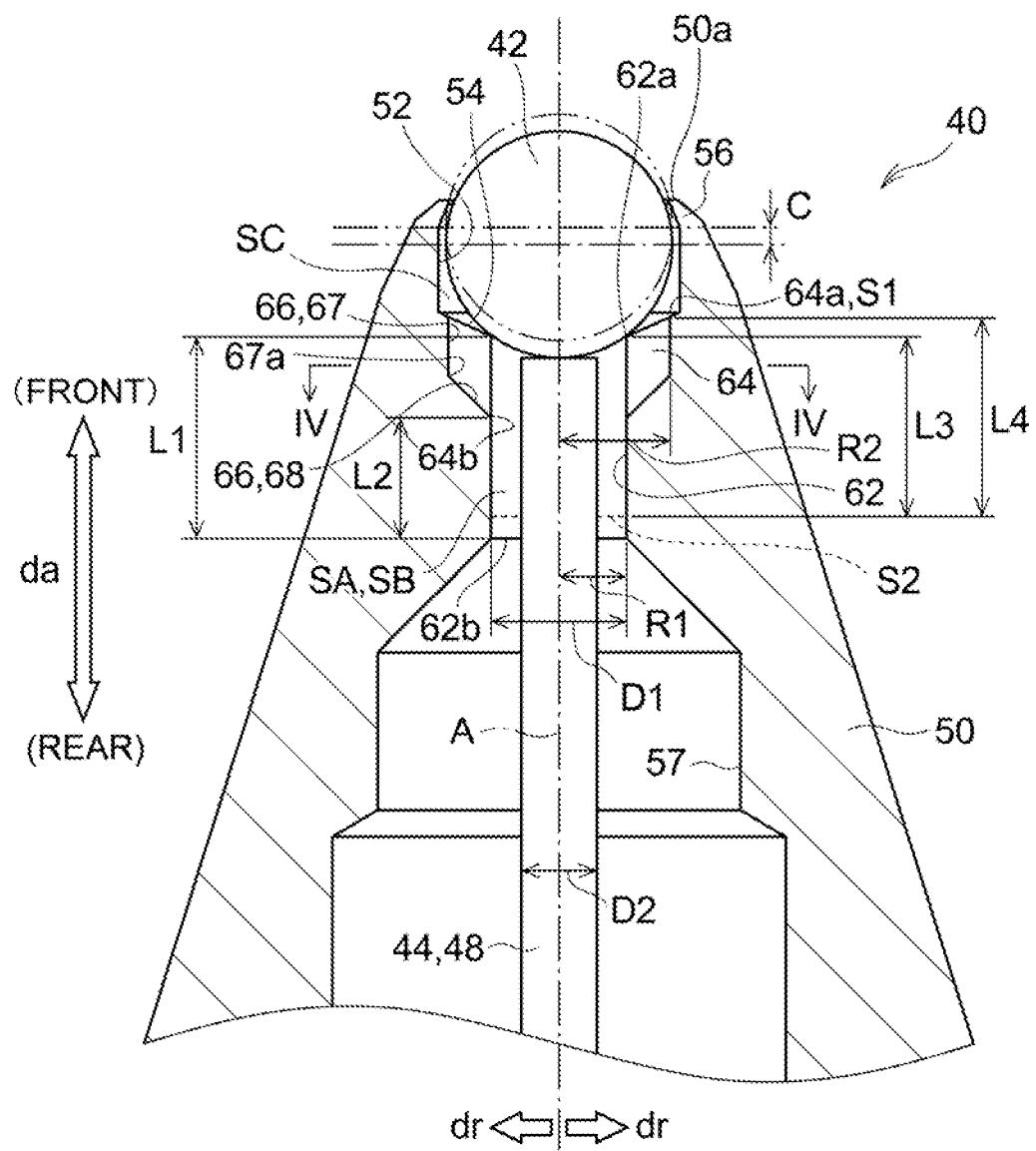
FIG. 3 is a further enlarged longitudinal sectional view illustrating a vicinity of a tip end of the ballpoint pen tip.
Figure 4:
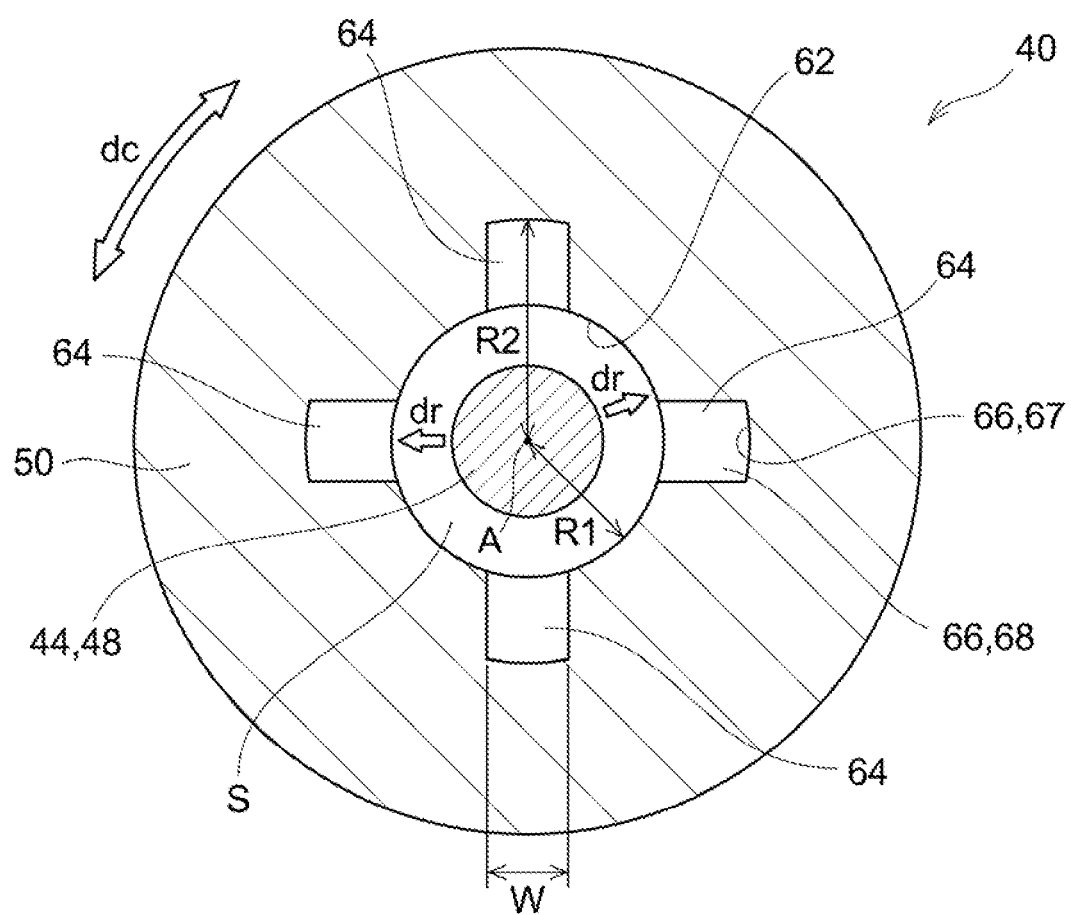
FIG. 4 is a transverse sectional view taken along line IV-IV in FIG. 3.

The ballpoint pen tip 40 will be further described with reference to FIGS. 2 to 4. FIG. 2 is an enlarged longitudinal sectional view illustrating the ballpoint pen tip 40, FIG. 3 is a further enlarged longitudinal sectional view illustrating the vicinity of the tip end of the ballpoint pen tip 40, and FIG. 4 is a transverse sectional view corresponding to line IV-IV in FIG. 3.

The ballpoint pen tip 40 includes a ball 42 and a tip body 50 that holds the ball 42. The tip body 50 is formed of, for example, a metal material such as stainless steel. In consideration of corrosion resistance and the like, the tip body 50 is preferably formed of stainless steel. In addition, the ball 42 is formed of, for example, a metal material such as tungsten carbide cemented carbide. The diameter of the ball 42 can be set to, for example, more than 0 mm and 0.5 mm or less. Preferably, the diameter of the ball 42 can be set to 0.2 mm or more and 0.5 mm or less. The tip body 50 has a function of guiding the ink stored in the ink storage cylinder 32 to the ball 42. At the time of writing, when the user moves the ball 42 on the writing surface while pressing the ball against the writing surface such as paper, the ball 42 rotates on the writing surface. As a result, the ink attached to the ball 42 is transferred to the writing surface. Then, handwriting is formed on the writing surface by the transferred ink. When a water-based shear-thinning ink of which viscosity decreases by the rotation of the ball 42 is used as the ink, the ink attached to the ball 42 penetrates into the writing surface as the ball 42 rotates on the writing surface. Then, the handwriting is formed on the writing surface by the penetrated ink.

The tip body 50 is manufactured by, for example, cutting. At this time, when a burr or the like due to cutting at the time of manufacture remains on the inner surface of the tip body 50, a flow of the ink in the tip body 50 may be inhibited by the burr. In order to solve this problem, it is conceivable to perform cleaning on the inner surface of the tip body 50 after manufacturing the tip body 50 by cutting. By this cleaning, the burr is removed, a surface roughness (arithmetic average roughness Ra) of the inner surface of the tip body 50 is reduced, and the inner surface is mirror-finished. However, according to the study of the present inventors, it has been found that there is a case where the flow of the ink in the tip body 50 is not greatly improved even when the cleaning is performed on the inner surface of the tip body 50. This is presumed to be because, when a water-based ink such as a water-based ink or a water-based shear-thinning ink is used as the ink, in stainless steel, a contact angle of the ink on the surface increases and spreading of the ink is suppressed, so that the ink easily flows on a surface having a large surface roughness as compared with a mirror surface having a surface roughness of, for example, an arithmetic average roughness Ra of less than 10 nm. Therefore, in the tip body 50, the surface roughness of at least one of an inner surface configuring a first space SA to be described later, an inner surface configuring a second space SB to be described later, and an inner surface configuring a third space SC to be described later is preferably 10 nm or more and 1 μm or less, more preferably 100 nm or more and 500 nm or less, and still more preferably 100 nm or more and 150 nm or less in the arithmetic average roughness Ra defined in JIS B0601: 2013.

The ballpoint pen tip 40 of the present embodiment has a resilient member 44 for biasing the ball 42 forward. In the example illustrated in FIG. 2, the resilient member 44 has a spring portion 46 and a rod portion 48 that extends forward from the spring portion 46 and comes into contact with the ball 42 from the rear. The spring portion 46 is configured by, for example, a coil spring. A rear end of the rod portion 48 is coupled to the spring portion 46, and a front end of the rod portion 48 is in contact with the ball 42 from the rear. In the illustrated example, the rear end of the spring portion 46 is in contact with the tip holder 34. In this state, the spring portion 46 is in a compressed state, and a biasing force is generated in a direction in which the spring portion 46 extends. The rod portion 48 transmits the biasing force of the spring portion 46 to the ball 42. As a result, a force that biases the ball 42 forward always acts on the ball 42. A diameter D2 of the rod portion 48 can be set to, for example, 0.01 mm or more and 0.3 mm or less. Preferably, the diameter D2 can be set to 0.05 mm or more and 0.2 mm or less.

The tip body 50 has a ball holding chamber 52, a rear hole 57, an ink flow hole 62, and an ink flow groove 64. The ball holding chamber 52 has a function of holding the ball 42, and a function of holding the ink in the ball holding chamber 52 and attaching the ink to the ball 42. The ball holding chamber 52 is configured by a hole formed rearward from the front end of the tip body 50. The ball holding chamber 52 has a rear wall 54. The rear wall 54 is a wall that defines a rear portion of the ball holding chamber 52. The central axis of the tip body 50 coincides with the central axis A of the ballpoint pen 10. Therefore, in the present specification, the central axis of the tip body 50 may be referred to as a central axis A. After the ball 42 is disposed in the ball holding chamber 52, the tip end portion of the tip body 50 is crimped so as to be deformed inward (toward the central axis A), whereby the ball 42 is held in the ball holding chamber 52. Therefore, the tip body 50 has a crimped portion 56 deformed inward (toward the central axis A) at the tip end portion.

In the ball holding chamber 52, the ball 42 is movable in the front-rear direction. In FIG. 3, the ball 42 located rearmost in the ball holding chamber 52 is indicated by a solid line, and the ball 42 located foremost in the ball holding chamber 52 is indicated by a two-dot chain line. At the time of non-writing, the ball 42 is located at the foremost in the ball holding chamber 52 by the biasing force of the resilient member 44 and comes into contact with the crimped portion 56 of the tip body 50. At this time, a gap between the ball 42 and the crimped portion 56 is sealed. As a result, an outflow of the ink at the time of non-writing is suppressed, and the drying of the ink in the ball holding chamber 52 is suppressed. When writing is performed with the ballpoint pen 10, a rearward force due to writing pressure acts on the ball 42, so that the ball 42 moves rearward against the biasing force of the resilient member 44, and the gap is generated between the ball 42 and the crimped portion 56. When the ball 42 rotates on the writing surface, the ink attached to the ball 42 is carried from the ball holding chamber 52 to the writing surface through the gap, and is attached to the writing surface. When the ball 42 is located rearmost in the ball holding chamber 52, the ball 42 comes into contact with a junction between the rear wall 54 and the ink flow hole 62 (front end 62*a* of the ink flow hole 62). The movable range (clearance) C of the ball 42 in the front-rear direction with respect to the tip body 50 can be set to, for example, 0.015 mm or more and 0.06 mm or less. Preferably, the movable range C of the ball 42 can be set to 0.020 mm or more and 0.05 mm or less.

The rear hole 57 is located rearward of the ball holding chamber 52 and extends along the axial direction da. The rear hole 57 communicates with the ink storage cylinder 32 through the tip holder 34, and functions as a flow path of the ink from the ink storage cylinder 32 toward the ball holding chamber 52. The rear hole 57 is configured by a hole formed forward from the rear end of the tip body 50. The rear hole 57 includes a hole formed in a columnar shape. The central axis of the rear hole 57 coincides with the central axis A of the tip body 50. The rear hole 57 includes a plurality of cylindrical holes having different diameters, and the diameter of each cylindrical hole increases as it goes rearward.

The ink flow hole 62 is located between the ball holding chamber 52 and the rear hole 57, and allows the ball holding chamber 52 and the rear hole 57 to communicate with each other. The ink flow hole 62 extends linearly along the axial direction da. In the illustrated example, the ink flow hole 62 is a through-hole having a cylindrical shape. The ink flow hole 62 functions as a flow path of the ink from the rear hole 57 toward the ball holding chamber 52. An inner diameter (diameter) D1 of the ink flow hole 62 can be set to, for example, 40% or more and 90% or less of the diameter of the ball 42. Preferably, the inner diameter D1 can be set to 50% or more and 80% or less of the diameter of the ball 42. In addition, the inner diameter D1 can be set to, for example, 0.2 mm or more and 0.45 mm or less. Preferably, the inner diameter D1 can be set to 0.25 mm or more and 0.4 mm or less. The central axis of the ink flow hole 62 coincides with the central axis A of the tip body 50. Therefore, a distance R1 from the central axis A of the tip body 50 to a peripheral wall of the ink flow hole 62 coincides a radius of the ink flow hole 62.

In addition, a length L1 of the ink flow hole 62 can be set to, for example, more than 0% and 90% or less of the diameter of the ball 42. Preferably, the length L1 can be set to 40% or more and 80% or less of the diameter of the ball 42. In addition, the length L1 can be set to, for example, more than 0 mm and 0.45 mm or less. Preferably, the length L1 can be set to 0.2 mm or more and 0.4 mm or less. Here, the length L1 of the ink flow hole 62 is a length from the front end 62*a* of the ink flow hole 62 to the rear end 62*b* of the ink flow hole 62 along the axial direction da. In the illustrated example, the front end 62*a* of the ink flow hole 62 is a foremost portion of the portion having the inner diameter D1, and the rear end 62*b* of the ink flow hole 62 is a rearmost portion of the portion having the inner diameter D1. The front end 62*a* of the ink flow hole 62 comes into contact with the ball 42 when the ball 42 is located rearmost in the ball holding chamber 52. When the ink flow hole 62 has such dimensions D1 and/or L1, an amount of the ink flowing through the ink flow hole 62 can be appropriately secured.

The ink flow groove 64 is a groove extending in the radial direction dr from the ink flow hole 62 and opening to the ball holding chamber 52. The ink flow groove 64 communicates with the ink flow hole 62 and the ball holding chamber 52. On the other hand, the ink flow groove 64 does not reach the rear hole 57. A front end 64*a* of the ink flow groove 64 is located on the rear wall 54 of the ball holding chamber 52. In addition, a rear end 64*b* of the ink flow groove 64 is located on the peripheral wall of the ink flow hole 62. Since the tip body 50 has such an ink flow groove 64, even when the ball 42 is located rearmost in the ball holding chamber 52 and in contact with the front end 62*a* of the ink flow hole 62 (see FIG. 3), a gap is formed between the ball 42 and the front end 64*a* of the ink flow groove 64, and the ink can flow from the ink flow hole 62 to the ball holding chamber 52 through the ink flow groove 64.

The ink flow groove 64 has a peripheral wall 66 facing the ink flow hole 62. The peripheral wall 66 is a wall that defines an outer contour of the ink flow groove 64 in the radial direction dr. The peripheral wall 66 includes a main portion 67 and an inclined portion 68 located rearward of the main portion 67. In the example illustrated in FIGS. 3 and 4, the main portion 67 extends along both the axial direction da and the circumferential direction dc. The inclined portion 68 couples the main portion 67 and the ink flow hole 62. The inclined portion 68 extends in a direction inclined with respect to both the axial direction da and the radial direction dr so as to approach the ink flow hole 62 as it goes rearward. A distance R2 from the central axis A of the tip body 50 to the peripheral wall 66 (main portion 67) of the ink flow groove 64 can be set to, for example, 40% or more and 200% or less of the diameter of the ball 42. Preferably, the distance R2 can be set to 60% or more and 150% or less of the diameter of the ball 42. In addition, the distance R2 can be set to, for example, 0.2 mm or more and 1 mm or less. Preferably, the distance R2 can be set to 0.3 mm or more and 0.7 mm or less.

As described above, the ink flow groove 64 does not reach the rear hole 57. Therefore, the ink flow hole 62 has a region where the ink flow groove 64 is not formed, in the rear of the ink flow groove 64. This region is a region having the smallest cross-sectional area orthogonal to the central axis A in the ink flow path from the rear hole 57 to the ball holding chamber 52. According to the study of the present inventors, the length of this region along the axial direction da affects an amount of the ink flowing through the ink flow path in the tip body 50. In order to secure an appropriate ink flow rate in the tip body 50, the length L2 of the region where the ink flow groove 64 is not formed in the ink flow hole 62 can be set to, for example, 20% or more and 80% or less of the diameter of the ball 42. Preferably, the length L2 can be set to 40% or more and 60% or less of the diameter of the ball 42. In addition, the length L2 can be set to, for example, 0.1 mm or more and 0.4 mm or less. Preferably, the length L2 can be set to 0.2 mm or more and 0.3 mm or less. The length L2 is defined as a length from the rear end 64b of the ink flow groove 64 to the rear end 62b of the ink flow hole 62.

In addition, a width W of the ink flow groove 64 along the direction orthogonal to both the axial direction da and the radial direction dr can be set to, for example, 0.01 mm or more and 0.15 mm or less. Preferably, the width W can be set to 0.05 mm or more and 0.1 mm or less.

The tip body 50 has one ink flow groove 64 or a plurality of ink flow grooves 64. When the tip body 50 has the plurality of ink flow grooves 64, each of the ink flow grooves 64 may be disposed at equal angular intervals from each other along the circumferential direction dc. In the example illustrated in FIG. 4, the tip body 50 has four ink flow grooves 64 disposed at equal angular intervals along the circumferential direction dc.

As described above, in the conventional ballpoint pen, when the ballpoint pen is left for a long period of time without writing, the ink may be dried and solidified in the ball holding chamber. In this case, the ink is not appropriately supplied to the ball, and there have been problems that handwriting is blurred, writing cannot be performed at all, and the like. As a result of intensive studies by the present inventors on a method for solving this problem, it has been found that drying of the ink in the ball holding chamber 52 can be effectively suppressed when the volume of a space (first space) SA in the ink flow hole 62 and the ink flow groove 64 measured rearward from the front end 64a of the ink flow groove 64 as a start point is a predetermined value or more. Hereinafter, the space SA will be described.

The front end 64a of the ink flow groove 64 is set as a start point S1 of the space SA. A position where a distance L3 measured rearward from the front end 62a of the ink flow hole 62 is 0.3 mm is set as an end point S2. Then, the volume of the space SA in the ink flow hole 62 and the ink flow groove 64 from the start point S1 to the end point S2 is defined. In FIG. 3, a length from the start point S1 to the end point S2 of the space SA along the axial direction da is indicated by L4.

The space SA is defined under the following conditions. It is assumed that the ball 42 is located rearmost in the ball holding chamber 52 and is in contact with the front end 62a of the ink flow hole 62. In this case, a part of the ball 42 is located in the ink flow hole 62. The space in ball holding chamber 52 is not included in the space SA. A portion that is not filled with the ink is not included in the space SA even when the portion is located in the length L4. The portion not filled with the ink is, for example, a portion occupied by the ball 42 and a portion occupied by the resilient member 44. Specifically, the portion occupied by the ball 42 is a portion of the ball 42 located in the ink flow hole 62. In addition, the portion occupied by the resilient member 44 is a portion located between the start point S1 and the end point S2 of the space SA in the rod portion 48 of the resilient member 44. More specifically, the portion occupied by the resilient member 44 is a portion between the front end of the rod portion 48 and the end point S2. The space SA is defined under the above conditions, and the volume of the space SA can be calculated.

In the present embodiment, the volume of the space SA can be set to mm$^3$ or more. Preferably, the volume of the space SA can be set to 0.02 mm$^3$ or more and 0.08 mm$^3$ or less. More preferably, the volume of the space SA can be set to 0.25 mm$^3$ or more and 0.05 mm$^3$ or less.

The present inventors have found that the drying of the ink in the ball holding chamber 52 can be suppressed by sufficiently securing the amount of the ink existing in the region located rearward of the ball 42 and close to the ball 42. Further studies have found that, in particular, the volume of the space SA of the ink flow hole 62 and the ink flow groove 64 in the region between the start point and the end point when the front end 64a of the ink flow groove 64 is the start point and the position of 0.3 mm rearward from the front end 62a of the ink flow hole 62 is the end point significantly affect the drying property of the ink in the ball holding chamber 52. As a result, it has become clear that the drying property of the ink in the ball holding chamber 52 can be controlled based on the volume of the space SA regardless of the shapes and dimensions of the ink flow hole 62 and the ink flow groove 64. This is considered to be because the ink in the ball holding chamber 52 easily dries due to generation of a minute gap between the tip end portion (crimped portion 56) and the ball 42 even at the time of non-writing due to a dent, a fiber, or the like, but when the volume of the space SA is sufficiently secured, the ink in the ball holding chamber 52 can be suppressed from being dried by being wetted by a sufficient amount of the ink existing in the space SA located rearward of the ball holding chamber 52. In addition, the present inventors have further studied a numerical range of the volume of the space SA, and specified the above range as an appropriate numerical range. Such a technical idea that the drying property of the ink in the ball holding chamber 52 can be controlled based on the volume of the space SA is not conventionally known, and it can be said that the present invention has a great technical contribution to the related art.

In the present embodiment, a space (second space SB) in the ink flow hole 62 and the ink flow groove 64 from the start point S1 to a position of a length of 60% of the diameter of the ball 42 from the front end 62a of the ink flow hole 62 toward the rear in the axial direction da is defined under the following conditions. It is assumed that the ball 42 is located rearmost in the ball holding chamber 52 and is in contact with the front end 62a of the ink flow hole 62. In this case, a part of the ball 42 is located in the ink flow hole 62. The space inside the ball holding chamber 52 is not included in the space SB. A portion that is not filled with the ink is not included in the space SB even when the portion is located in the length L4. The portion not filled with the ink is, for example, a portion occupied by the ball 42 and a portion occupied by the resilient member 44. Specifically, the portion occupied by the ball 42 is a portion of the ball 42 located in the ink flow hole 62. In addition, the portion occupied by the resilient member 44 is a portion of the rod portion 48 of the resilient member 44 located between the start point S1 and the position of the length of 60% of the diameter of the ball 42 from the front end 62a of the ink flow hole 62 toward the rear in the axial direction da. More specifically, the portion occupied by the resilient member 44 is a portion from the front end of the rod portion 48 to a position of a length of 60% of the diameter of the ball 42 from the front end 62a of the ink flow hole 62 toward the rear in the axial direction da. The space SB is defined under the above conditions, and the volume of the space SB can be calculated.

The present inventors have found that the volume of the space SB of the ink flow hole 62 and the ink flow groove 64 in the region between the front end 64a of the ink flow groove 64 as a start point and the position of 60% of the diameter of the ball 42 rearward from the front end 62a of the ink flow hole 62 has a large effect on the drying property of the ink in the ball holding chamber 52, similarly to the volume of the space SA. As a result, it has become clear that the drying property of the ink in the ball holding chamber 52 can be controlled based on the volume of the space SB regardless of the shapes and dimensions of the ink flow hole 62 and the ink flow groove 64. Specifically, it has been clarified that the drying property of the ink in the ball holding chamber 52 can be controlled when the space SC in the ball holding chamber 52 from the tip end 50a of the tip body 50 to the start point S1 is defined and the ratio of the volume of the space SB to the volume of the space SC is within a certain range.

The space (third space) SC in the ball holding chamber 52 from the tip end 50a of the tip body 50 to the start point S1 is defined under the following conditions. It is assumed that the ball 42 is located rearmost in the ball holding chamber 52 and is in contact with the front end 62a of the ink flow hole 62. A portion not filled with the ink is not included in the space SC even when the portion is located between the tip end 50a and the start point S1. Specifically, the portion not filled with the ink is a portion occupied by the ball 42. The space SC is defined under the above conditions, and the volume of the space SC can be calculated.

The volume of the space SB can be set to 1.6 times or more the volume of the space SC. As a result, the volume of the space SB can be sufficiently secured, so that drying of the ink in the space SC of the ball holding chamber 52 can be further suppressed. Preferably, the volume of the space SB can be set to 1.6 times or more and 5 times or less the volume of the space SC. In addition, preferably, the volume of the space SB can be set to 1.7 times or more the volume of the space SC. More preferably, the volume of the space SB can be set to 1.7 times or more and 3 times or less the volume of the space SC.

In addition, the volume of the space SA can be set to 1.5 times or more the volume of the space SC. As a result, the volume of the space SA can be sufficiently secured, so that drying of the ink in the space SC of the ball holding chamber 52 can be further suppressed. Preferably, the volume of the space SA can be set to 1.5 times or more and 5 times or less the volume of the space SC. In addition, preferably, the volume of the space SA can be set to 1.7 times or more the volume of the space SC. More preferably, the volume of the space SA can be set to 1.7 times or more and 3 times or less the volume of the space SC.

The ballpoint pen tip 40 according to the present embodiment includes a ball 42 having a diameter of 0.5 mm or less, and a tip body 50 that holds the ball 42, the tip body 50 has a ball holding chamber 52 that holds the ball 42, a rear hole 57 located rearward of the ball holding chamber 52, an ink flow hole 62 that allows the ball holding chamber 52 and the rear hole 57 to communicate with each other, and an ink flow groove 64 extending in a radial direction dr from the ink flow hole 62, opening to the ball holding chamber 52, and not reaching the rear hole 57, when an ink consumption per 100 m of handwriting is A (mg) and the diameter of the ball 42 is B (mm), a ratio (A/B) of the ink consumption A to the diameter B of the ball 42 is 200 mg/mm or more and 800 mg/mm or less, and when a front end 64a of the ink flow groove 64 is set as a start point S1 and a position of 0.3 mm rearward from the front end 62a of the ink flow hole 62 is set as an end point S2, a volume of a space SA in the ink flow hole 62 and the ink flow groove 64 from the start point S1 to the end point S2 is 0.02 mm$^3$ or more.

The ballpoint pen refill 30 of the present embodiment includes the ballpoint pen tip 40 described above and an ink storage cylinder 32 that stores an ink.

The ballpoint pen 10 of the present embodiment includes the ballpoint pen refill 30 described above.

According to such a ballpoint pen tip 40, a ballpoint pen refill 30, and a ballpoint pen 10, the volume of the space SA of the ink flow hole 62 and the ink flow groove 64 is sufficiently secured in the region close to the ball 42, particularly in the region between the start point S1 and the end point S2 when the front end 64a of the ink flow groove 64 is the start point S1 and the position of 0.3 mm rearward from the front end 62a of the ink flow hole 62 is the end point S2, so that the amount of the ink existing in the region close to the ball 42 can be increased. As a result, drying of the ink in the ball holding chamber 52 can be effectively suppressed. In particular, even when the ballpoint pen 10 is left for a long period of time without being used, drying of the ink in the ball holding chamber 52 is effectively suppressed.

In the ballpoint pen tip 40 of the present embodiment, the volume of the space SA in the ink flow hole 62 and the ink flow groove 64 from the start point S1 to the end point S2 is 1.5 times or more the volume of the space SC in the ball holding chamber 52 from the tip end 50a of the tip body 50 to the start point S1.

According to such a ballpoint pen tip 40, since the volume of the space SA can be sufficiently secured, drying of the ink in the space SC of the ball holding chamber 52 can be further suppressed.

In the ballpoint pen tip 40 of the present embodiment, the inner diameter D1 of the ink flow hole 62 is 40% or more of the diameter of the ball 42.

According to such a ballpoint pen tip 40, since a cross-sectional area of the ink flow hole 62 can be sufficiently secured, the amount of the ink existing in the region close to the ball 42 can be further increased.

In the ballpoint pen tip 40 of the present embodiment, the length L1 of the ink flow hole 62 is 90% or less of the diameter of the ball 42.

According to such a ballpoint pen tip 40, since the length of the ink flow hole 62 along the axial direction da having a relatively small cross-sectional area in the ink flow path from the rear hole 57 toward the ball holding chamber 52 can be reduced, the resistance to the ink flow in the ink flow hole 62 is reduced. Therefore, the flow rate of the ink from the rear hole 57 to the ball holding chamber 52 can be increased, and the amount of the ink existing in the region close to the ball 42 can be sufficiently secured.

In the ballpoint pen tip 40 of the present embodiment, the length L2 of the region where the ink flow groove 64 is not formed in the ink flow hole 62 is 90% or less of the diameter of the ball 42.

The region of the ink flow hole 62 where the ink flow groove 64 is not formed is a region having the smallest cross-sectional area in the ink flow path from the rear hole 57 toward the ball holding chamber 52. According to the ballpoint pen tip 40 of the present embodiment, since the length along the axial direction da in such a region having the smallest cross-sectional area can be reduced, the resistance in the ink flow path is reduced. Therefore, the flow rate of the ink from the rear hole 57 to the ball holding chamber 52 can be further increased, and the amount of the ink existing in the region close to the ball 42 can be sufficiently secured.

The ballpoint pen tip 40 of the present embodiment further includes the resilient member 44 having the spring portion 46 and the rod portion 48 extending forward from the spring portion 46 and coming into contact with the ball 42 from the rear.

According to such a ballpoint pen tip 40, at the time of non-writing, the ball 42 is located foremost in the ball holding chamber 52 by the biasing force of the resilient member 44 and comes into contact with the crimped portion 56 of the tip body 50. At this time, a gap between the ball 42 and the crimped portion 56 is sealed. As a result, an outflow of the ink at the time of non-writing is suppressed, and the drying of the ink in the ball holding chamber 52 is suppressed.

In the ballpoint pen tip 40 of the present embodiment, the movable range C of the ball 42 in the front-rear direction with respect to the tip body 50 is 0.015 mm or more and 0.06 mm or less.

When the ball 42 has such a movable range C, a gap that can be generated between the ball 42 and the crimped portion 56 becomes relatively large, and the ink in the ball holding chamber 52 is easily dried. Therefore, in such a ballpoint pen tip 40, the effect of suppressing drying of the ink in the ball holding chamber 52 by setting the volume of the space SA to 0.02 mm$^3$ or more is greatly exhibited.

EXAMPLES

Hereinafter, the present invention will be described in more detail with reference to Examples, but the present invention is not limited to these Examples.

Samples of five ballpoint pen tips of the following sample numbers 1 to 5 were prepared, and each sample was left for a predetermined period of time and then subjected to a writing property test to evaluate the quality of the handwriting.

Dimensions and Material of Sample

In all the samples, the following conditions were common.

Diameter of ball: 0.5 (mm)
Number of ink flow grooves: four
Distance R2 from central axis to main portion of peripheral wall of ink flow groove: 0.245 (mm)
Width W of ink flow groove: 0.09 (mm)
Length of main portion of peripheral wall of ink flow groove: 0.13 (mm)
Material of ball: tungsten carbide
Material of tip body: stainless steel material
Material of resilient member: stainless steel material
Composition of Ink Composition 25 parts by weight of a thermochromic microcapsule pigment (which had been cooled to −20° C. or lower in advance to develop a black color), 0.3 parts by weight of a shear thinning agent (xanthan gum), 10 parts by weight of urea, 10 parts by weight of glycerin, 0.5 parts by weight of a nonionic permeability imparting agent [manufactured by San Nopco Ltd., product name: Nopco SWWET-366], 0.1 parts by weight of a modified silicone antifoaming agent [manufactured by San Nopco Ltd., product name: Nopco 8034], 0.5 parts by weight of a phosphoric acid ester surfactant [manufactured by DKS Co., Ltd., product name: PRIESURF AL], 0.5 parts by weight of a pH adjusting agent (triethanolamine), 0.2 parts by weight of an antifungal agent [manufactured by Lonza Japan, product name: Proxel XL-2], and 52.9 parts by weight of water were mixed to adjust an ink composition. The obtained ink composition had a pH of 8.0 at 20° C. and a viscosity of 780 mPa·s at a shear rate of 3.84 sec$^{-1}$ and 35.0 mPa·s at a shear rate of 384 sec$^{-1}$ as measured at 20° C.

The ballpoint pen tips of the samples 1 to 5 illustrated in Table 1 were attached to one end of a polypropylene ink storage cylinder through a tip holder, the above ink composition was filled in the ink storage cylinder, and an ink backflow inhibitor was closely attached to the rear end surface of the ink and filled to obtain a ballpoint pen refill. The ink consumption per 100 m of the handwriting of this ballpoint pen refill was 140 mg.

Evaluation Method

Each sample was allowed to stand in a thermostatic bath set at a temperature of 50° C. and a humidity of 0% for 60 days, and then the pen tip was continuously moved so as to draw circles having a diameter of 10 mm while bringing the pen tip into contact with the paper surface to form the handwriting. In this case, the handwriting blur may occur in some circles from a starting end of the handwriting. In this example, the obtained handwriting was evaluated according to the following evaluation criteria by using the number of circles in which the handwriting blur occurred.

A: The number of circles in which blur was generated was six or less.

B: The number of circles in which blur was generated was seven or more.

When the evaluation is A, it can be said that drying of the ink in the ball holding chamber is sufficiently suppressed because the number of circles in which blur has occurred is relatively small. On the other hand, when the evaluation is B, since the number of circles in which blur has occurred is relatively large, it cannot be said that the drying of the ink in the ball holding chamber is sufficiently suppressed. In particular, the evaluation B here is considered to be a practically unusable level.

In Table 1, D1 is an inner diameter (mm) of the ink flow hole. D2 is a diameter (mm) of the rod portion of the resilient member. L1 is a length (mm) of the ink flow hole, and L5 is a length (mm) from the front end (64a) of the ink flow groove to the front end (62a) of the ink flow hole along the axial direction da. L6 is a length of the inclined portion of the peripheral wall of the ink flow groove along the axial direction da, that is, a length (mm) from the rear end (67a) of the main portion to the rear end (64b) of the inclined portion along the axial direction da. V1 is a volume (mm$^3$) of the first space (SA). V2 is a volume (mm$^3$) of the second space (SB). V3 is a volume (mm$^3$) of the third space (SC). V1/V3 is a ratio of the volume V1 (mm$^3$) to the volume V3 (mm$^3$). V2/V3 is a ratio of the volume V2 (mm$^3$) to the volume V3 (mm$^3$). In the samples 1 to 5 having a ball diameter of 0.5 (mm), the length of 60% of the ball diameter (diameter) is 0.3 (mm), and the value of V1 and the value of V2 are the same. Accordingly, in the samples 1 to 5, the value of V1/V3 and the value of V2/V3 are the same.

TABLE 1

| SAMPLE No. | D1 (mm) | D2 (mm) | L1 (mm) | L5 (mm) | L6 (mm) | V1 (mm$^3$) | V2 (mm$^3$) | V3 (mm$^3$) | V1/V3 | V2/V3 | EVALUATION |
|---|---|---|---|---|---|---|---|---|---|---|---|
| 1 | 0.3 | 0.14 | 0.45 | 0.03935 | 0.095 | 0.02090 | 0.02090 | 0.01188 | 1.759 | 1.759 | A |
| 2 | 0.3 | 0.14 | 0.3 | 0.03935 | 0.095 | 0.02090 | 0.02090 | 0.01188 | 1.759 | 1.759 | A |
| 3 | 0.25 | 0.12 | 0.45 | 0.04971 | 0.12 | 0.01805 | 0.01805 | 0.01166 | 1.548 | 1.548 | B |
| 4 | 0.25 | 0.14 | 0.45 | 0.04971 | 0.12 | 0.01693 | 0.01693 | 0.01251 | 1.353 | 1.353 | B |
| 5 | 0.25 | 0.14 | 0.3 | 0.04971 | 0.12 | 0.01693 | 0.01693 | 0.01251 | 1.353 | 1.353 | B |

Figure 5:
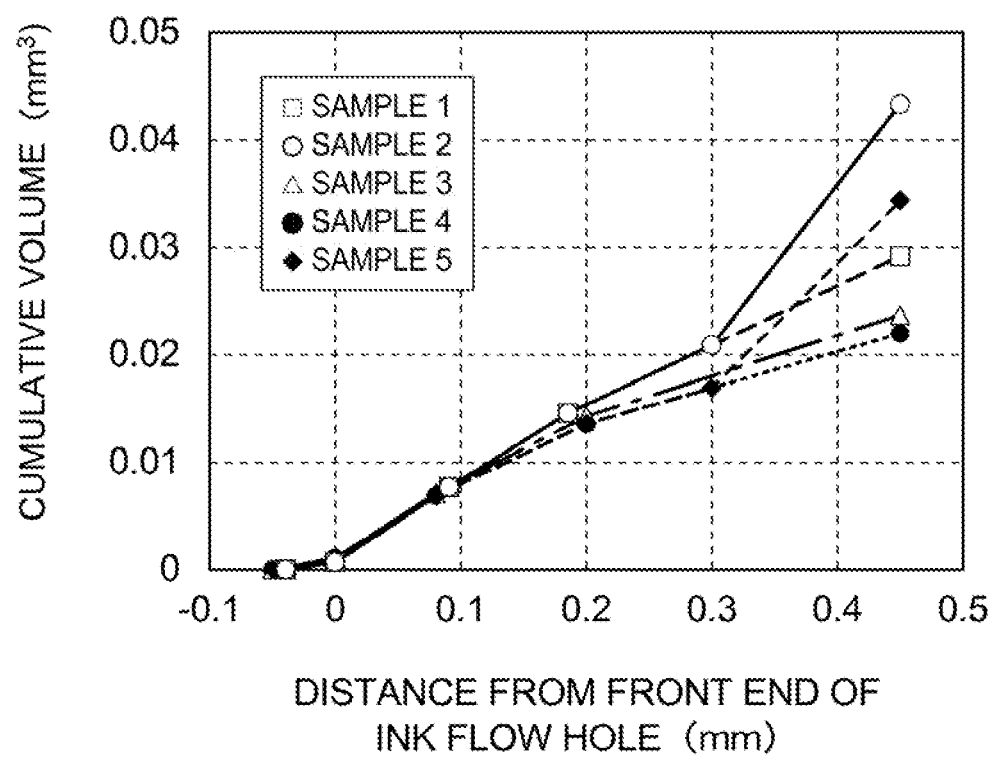
FIG. 5 is a graph illustrating a calculation result of a volume of a space in an ink flow hole and an ink flow groove of a ballpoint pen tip.

FIG. 5 is a graph illustrating a calculation result of the volume of the space (SA) in the ink flow hole and the ink flow groove in each sample. In the graph of FIG. 5, a horizontal axis represents a distance (mm) from the front end (62a) of the ink flow hole, more specifically, the horizontal axis represents a distance measured rearward along the axial direction da with the front end of the ink flow hole as 0 mm. A portion with a negative distance on the horizontal axis indicates a portion located forward of the front end of the ink flow hole. A vertical axis represents a cumulative volume (mm$^3$) of the space (SA) at each position along the axial direction da. This cumulative volume is calculated with the front end (64a) of the ink flow groove as a start point. That is, the cumulative volume at the front end of the ink flow groove is 0 mm$^3$. Here, the front end of the ink flow groove is located forward of the front end of the ink flow hole (see FIG. 3). Therefore, the distance on the horizontal axis at the point where the cumulative volume is 0 mm$^3$ is negative. In addition, at the front end of the ink flow hole of which the distance on the horizontal axis is 0 mm, the cumulative volume is larger than 0 mm$^3$.

As illustrated in Table 1 and FIG. 5, in the samples 1 and 2, the cumulative volume is 0.2 mm$^3$ or more at the point where the distance on the horizontal axis, that is, the distance from the front end of the ink flow hole is mm. On the other hand, in the samples 3 to 5, the cumulative volume is less than 0.2 mm$^3$ at the point where the distance on the horizontal axis is mm. The cumulative volume at the point where the distance from the front end of the ink flow hole is 0.3 mm corresponds to the volume of the space (SA). In the samples 2 and 5 in which the length L1 of the ink flow hole is 0.3 mm, since the volume of the rear hole is accumulated in the region where the distance on the horizontal axis exceeds 0.3 mm, the cumulative volume rapidly increases with the point of 0.3 mm as a boundary.

In Table 1, the samples 1 and 2 having the volume V1 of 0.02 mm$^3$ or more are evaluated as A. That is, it can be seen that drying of the ink in the ball holding chamber 52 is effectively suppressed by the volume V1 of the space SA being 0.02 mm$^3$ or more. This is considered to be because the volume V1 of the space SA is 0.02 mm$^3$ or more, so that the amount of the ink existing in the region close to the ball 42 can be sufficiently secured. In addition, the samples 1 and 2 having the V1/V3 value of 1.5 times or more were evaluated as A. That is, when the value of V1/V3 is 1.5 times or more, drying of the ink in the ball holding chamber 52 is effectively suppressed. Further, the samples 1 and 2 having the V2/V3 value of 1.6 times or more were evaluated as A. That is, when the value of V2/V3 is 1.6 times or more, drying of the ink in the ball holding chamber 52 is effectively suppressed.

Second Embodiment

A second embodiment will be described with reference to FIGS. 6 to 9. In the following description, redundant description of parts that can be configured similarly to the first embodiment will be omitted. In addition, in the drawings used in the following description, the same reference numerals as those used for the corresponding parts in the first embodiment are used for parts that can be configured similarly to the first embodiment.

Conventionally, a ballpoint pen tip including a ball and a tip body for holding the ball has been used in a ballpoint pen.

JP2002-52884A discloses a ballpoint pen tip including a ball holding chamber for storing a ball, a rear hole located rearward of the ball holding chamber, an ink guide hole for allowing the ball holding chamber and the rear hole to communicate with each other, and an ink groove extending in a radial direction from the ink guide hole, and a ballpoint pen including the ballpoint pen tip.

In order to improve the handwriting concentration formed by the ballpoint pen, it has been studied to increase an amount of ink per unit length of the handwriting. However, the conventional ballpoint pen cannot sufficiently increase the amount of ink forming the handwriting. As a result of intensive studies by the present inventors on a solution to this problem, it has been found that the amount of ink supplied from the rear hole to the ball can be increased by improving the flow of the ink from the rear hole to the ink flow groove, and thus the amount of ink forming the handwriting can be increased.

The present embodiment has been made in consideration of such points, and an object thereof is to improve the flow of the ink from the rear hole to the ink flow groove in the ballpoint pen tip.

A ballpoint pen tip according to the present embodiment includes:

a ball, and a tip body that holds the ball, the tip body has a ball holding chamber that holds the ball, a rear hole located rearward of the ball holding chamber, an ink flow hole that allows the ball holding chamber and the rear hole to communicate with each other, and an ink flow groove extending in a radial direction from the ink flow hole, opening to the ball holding chamber, and reaching the rear hole, and a ratio (R1/R2) of a distance R1 from a central axis of the tip body to a peripheral wall of the ink flow hole to a distance R2 from the central axis to a peripheral wall of the rear hole is 0.9 or more.

In the ballpoint pen tip according to the present embodiment, a ratio (C1/C2) of a sum C1 of circumferential lengths of portions where the ink flow groove is formed in the peripheral wall of the ink flow hole to a sum C2 of circumferential lengths of portions where the ink flow groove is not formed in the peripheral wall of the ink flow hole may be 0.5 or more.

In the ballpoint pen tip according to the present embodiment, a movable range of the ball in a front-rear direction with respect to the tip body may be 0.015 mm or more and 0.05 mm or less.

A ballpoint pen refill according to the present embodiment includes:

the ballpoint pen tip described above; and an ink storage cylinder that stores an ink.

In the ballpoint pen refill according to the present embodiment, the ink may be a thermochromic ink.

A ballpoint pen according to the present embodiment includes:

the ballpoint pen refill described above.

According to the present embodiment, it is possible to improve the flow of the ink from the rear hole to the ink flow groove in the ballpoint pen tip.

Figure 6:
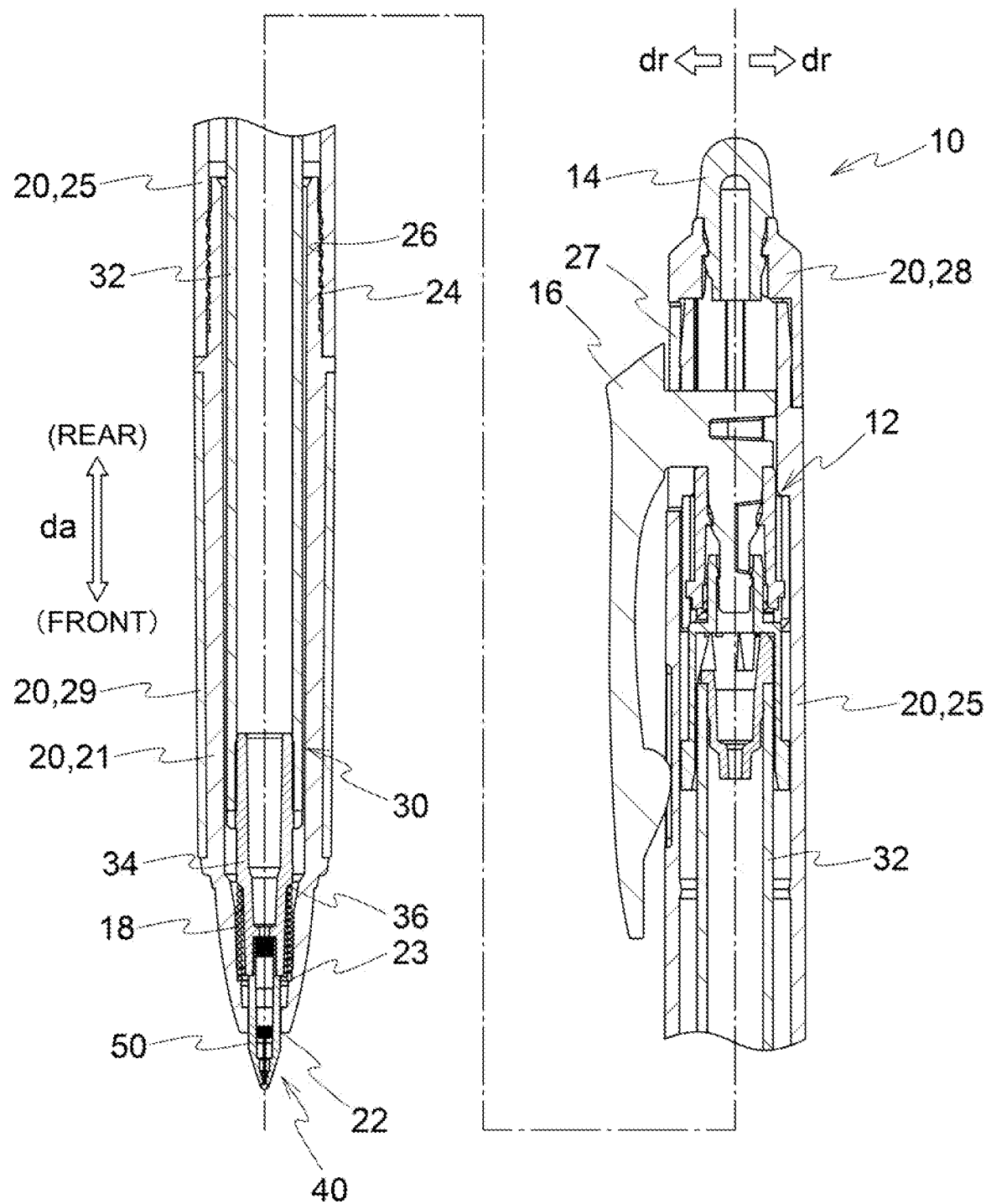
FIG. 6 is a view for describing a second embodiment, and is a longitudinal sectional view illustrating an example of a ballpoint pen into which a ballpoint pen refill having a ballpoint pen tip is incorporated.
Figure 7:
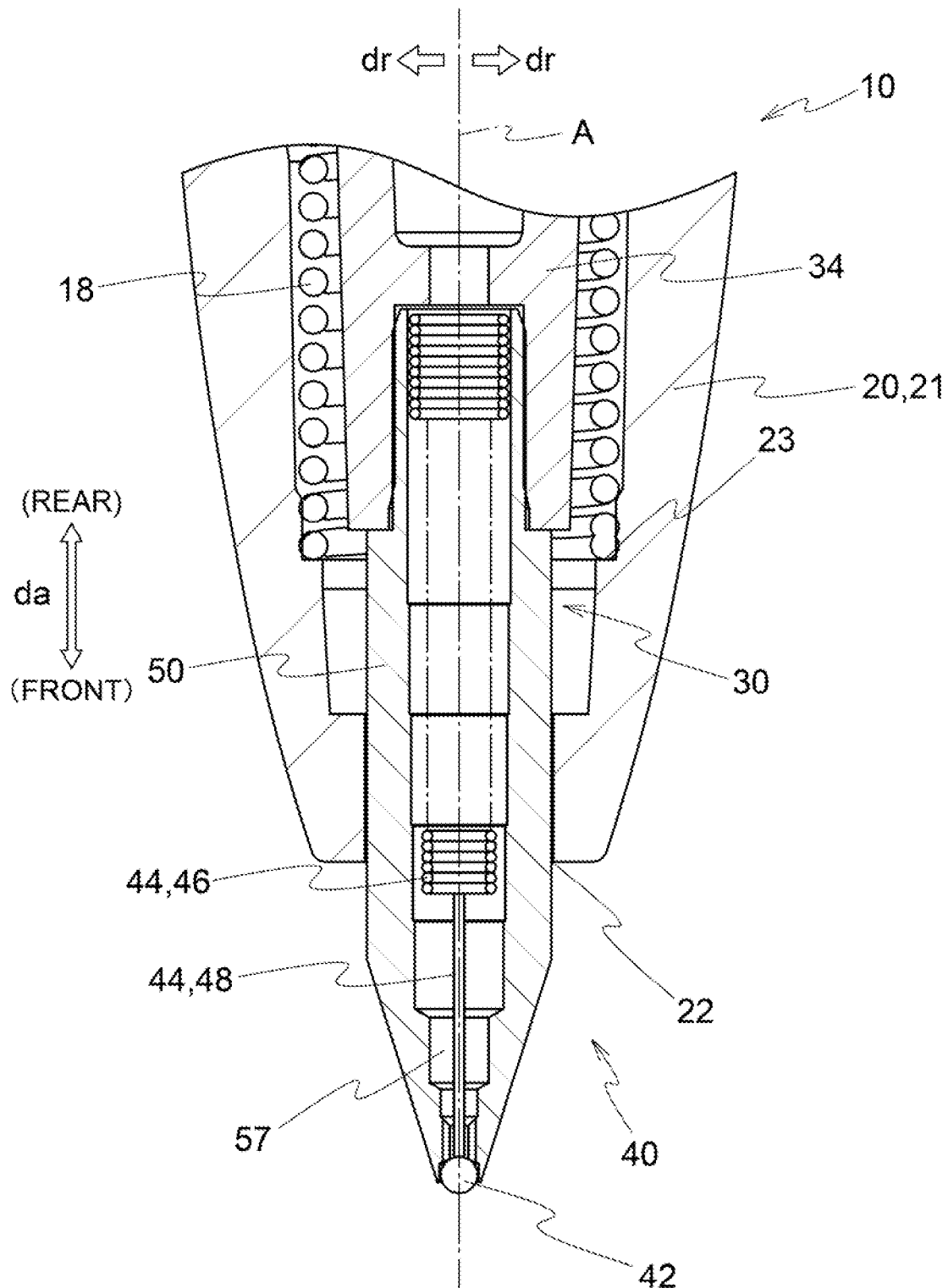
FIG. 7 is an enlarged longitudinal sectional view illustrating the ballpoint pen tip of FIG. 6.
Figure 8:
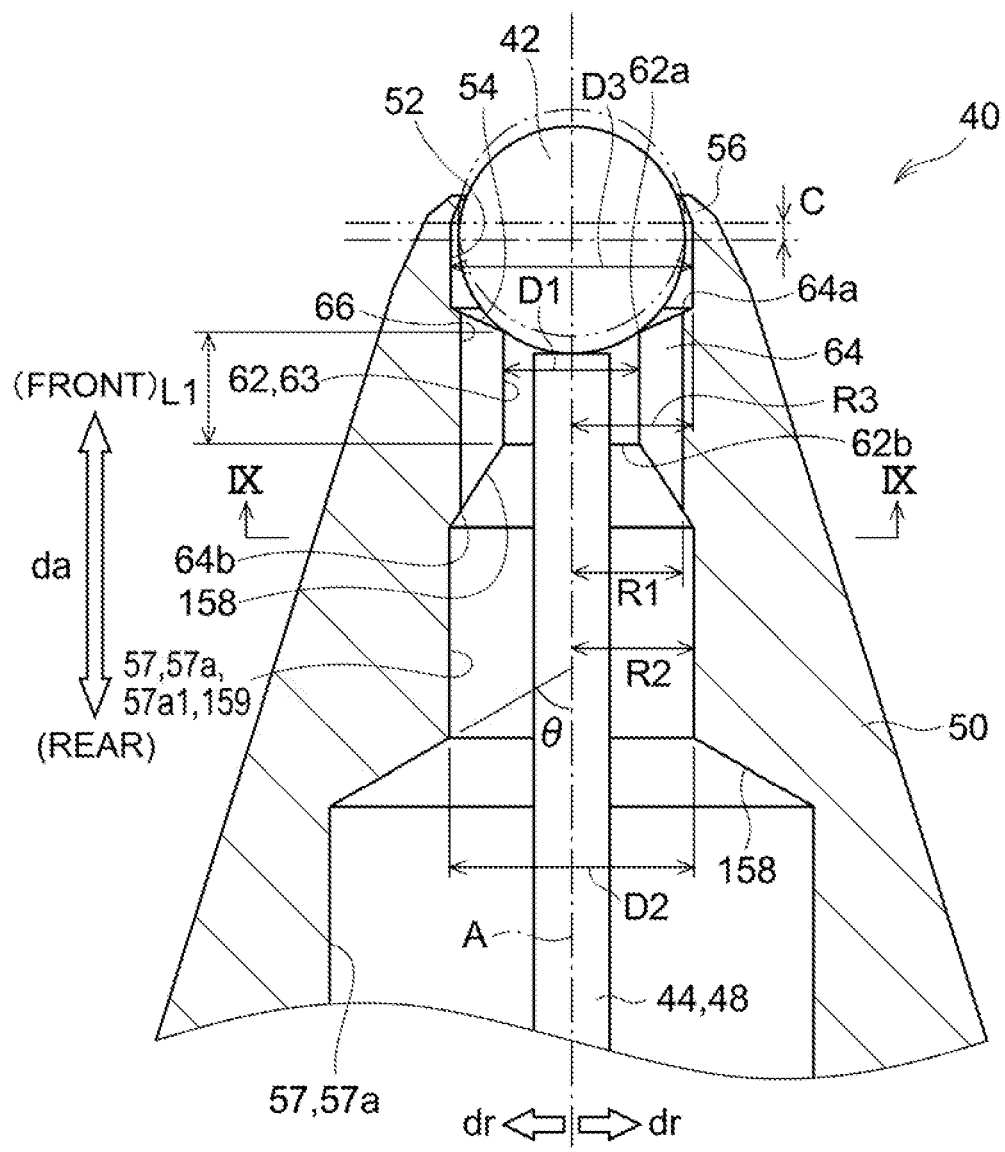
FIG. 8 is a further enlarged longitudinal sectional view illustrating a vicinity of a tip end of the ballpoint pen tip of FIG. 6.

FIG. 6 is a view for describing the present embodiment, and is a sectional view illustrating an example of the ballpoint pen 10, FIG. 7 is an enlarged longitudinal sectional view illustrating the ballpoint pen tip 40, and FIG. 8 is a further enlarged longitudinal sectional view illustrating the vicinity of the tip end of the ballpoint pen tip 40.

In the present embodiment, as the ink stored in the ballpoint pen refill 30, an ink that can be used for a ballpoint pen can be used without particular limitation. As an example, a thermochromic ink can be used as the ink. The thermochromic ink may be a reversibly thermochromic ink. As the reversibly thermochromic ink, for example, a heat-decoloring type reversibly thermochromic ink that changes from a coloring state to a decoloring state by heating and changes from a decoloring state to a coloring state by cooling can be used.

Specifically, general-purpose inks such as water-based gel inks having shear thinning, low-viscosity water-based inks, low-viscosity oily inks, high-viscosity oily inks, and emulsion inks can be applied depending on the type of ballpoint pen tip. Among them, water-based gel inks having shear thinning are particularly effective.

In addition, in the water-based gel ink having shear thinning, a coloring material is not particularly limited, and dyes, pigments, metallic luster tone pigments, fluorescent pigments, titanium oxide, thermochromic pigments, and the like can be used. In particular, since the thermochromic pigment itself has poor coloring power and it is difficult to obtain the handwriting concentration, the thermochromic pigment can be particularly preferably used in the present embodiment capable of improving the flow of the ink and improving the handwriting concentration.

Next, the ballpoint pen tip 40 of the present embodiment will be described. The ballpoint pen tip 40 includes a ball 42 and a tip body 50 that holds the ball 42. The tip body 50 is formed of, for example, a metal material such as stainless steel. In consideration of corrosion resistance and the like, the tip body 50 is preferably formed of stainless steel.

The tip body 50 is manufactured by, for example, cutting. At this time, when a burr or the like due to cutting at the time of manufacture remains on the inner surface of the tip body 50, a flow of the ink in the tip body 50 may be inhibited by the burr. In order to solve this problem, it is conceivable to perform cleaning on the inner surface of the tip body 50 after manufacturing the tip body 50 by cutting. By this cleaning, the burr is removed, a surface roughness (arithmetic average roughness Ra) of the inner surface of the tip body 50 is reduced, and the inner surface is mirror-finished. However, according to the study of the present inventors, it has been found that there is a case where the flow of the ink in the tip body 50 is not greatly improved even when the cleaning is performed on the inner surface of the tip body 50. This is presumed to be because, when a water-based ink such as a water-based ink or a water-based shear-thinning ink is used as the ink, in stainless steel, a contact angle of the ink on the surface increases and spreading of the ink is suppressed, so that the ink easily flows on a surface having a large surface roughness as compared with a mirror surface having a surface roughness of, for example, an arithmetic average roughness Ra of less than 10 nm. Therefore, the surface roughness of the inner surface of the tip body 50 is preferably 10 nm or more and 500 nm or less, more preferably 50 nm or more and 300 nm or less, and still more preferably 100 nm or more and 150 nm or less in the arithmetic average roughness Ra defined in JIS B0601: 2013.

The tip body 50 has a ball holding chamber 52, a rear hole 57, an ink flow hole 62, and an ink flow groove 64.

The ink flow hole 62 is located between the ball holding chamber 52 and the rear hole 57, and allows the ball holding chamber 52 and the rear hole 57 to communicate with each other. The ink flow hole 62 extends linearly along the axial direction da. In the illustrated example, the ink flow hole 62 is a through-hole having a cylindrical shape, and has a peripheral wall 63 having a cylindrical shape. The ink flow hole 62 functions as a flow path of the ink from the rear hole 57 toward the ball holding chamber 52. An inner diameter (diameter) D1 of the ink flow hole 62 can be set to, for example, 40% or more and 90% or less of the diameter of the ball 42. Preferably, the inner diameter D1 can be set to 50% or more and 80% or less of the diameter of the ball 42. In addition, the inner diameter D1 can be set to, for example, mm or more and 0.45 mm or less. Preferably, the inner diameter D1 is mm or more and 0.4 mm or less. The central axis of the ink flow hole 62 coincides with the central axis A of the tip body 50.

In addition, a length L1 of the ink flow hole 62 can be set to, for example, more than 0% and 90% or less of the diameter of the ball 42. Preferably, the length L1 can be set to 40% or more and 80% or less of the diameter of the ball 42. In addition, the length L1 can be set to, for example, more than 0 mm and 0.45 mm or less. Preferably, the length L1 can be set to 0.2 mm or more and 0.4 mm or less. Here, the length L1 of the ink flow hole 62 is a length from the front end 62a of the ink flow hole 62 to the rear end 62b of the ink flow hole 62 along the axial direction da. In the illustrated example, the front end 62a of the ink flow hole 62 is a foremost portion of the portion having the inner diameter D1, and the rear end 62b of the ink flow hole 62 is a rearmost portion of the portion having the inner diameter D1. The front end 62a of the ink flow hole 62 comes into contact with the ball 42 when the ball 42 is located rearmost in the ball holding chamber 52. When the ink flow hole 62 has such dimensions D1 and/or L1, an amount of the ink flowing through the ink flow hole 62 can be appropriately secured.

The ink flow groove 64 is a groove extending from the peripheral wall 63 of the ink flow hole 62 in the radial direction dr and opening to the ball holding chamber 52. The ink flow groove 64 reaches the ball holding chamber 52 and also reaches the rear hole 57. Accordingly, the ink flow groove 64 communicates with the ball holding chamber 52 and the rear hole 57. In the present embodiment, the ink flow groove 64 extends linearly in a direction parallel to the axial direction da. The front end 64a of the ink flow groove 64 is located on the rear wall 54 of the ball holding chamber 52. In addition, the rear end 64b of the ink flow groove 64 is located on an inclined surface 158 disposed forward of a foremost hole 57a1 of the rear hole 57. Since the tip body 50 has such an ink flow groove 64, even when the ball 42 is located rearmost in the ball holding chamber 52 and is in contact with the front end 62a of the ink flow hole 62 (see FIG. 8), a gap is formed between the ball 42 and the front end 64a of the ink flow groove 64, and the ink can flow from the rear hole 57 and the ink flow hole 62 to the ball holding chamber 52 through the ink flow groove 64.

The ink flow groove 64 has the peripheral wall 66 facing the ink flow hole 62. The peripheral wall 66 is a wall that defines an outer contour of the ink flow groove 64 in the radial direction dr. The peripheral wall 66 extends along both the axial direction da and the circumferential direction dc. The distance R1 from the central axis A of the tip body 50 to the peripheral wall 66 of the ink flow groove 64 can be set to, for example, 0.2 mm or more and 1 mm or less. Preferably, the distance R1 can be set to 0.3 mm or more and 0.7 mm or less.

In addition, the width W (see FIG. 9) of the ink flow groove 64 along a direction orthogonal to both the axial direction da and the radial direction dr can be set to, for example, 0.01 mm or more and 0.15 mm or less. Preferably, the width W can be set to 0.05 mm or more and 0.1 mm or less.

The tip body 50 has one ink flow groove 64 or a plurality of ink flow grooves 64. When the tip body 50 has the plurality of ink flow grooves 64, each of the ink flow grooves 64 may be disposed at equal angular intervals from each other along the circumferential direction dc. In the example illustrated in FIG. 9, the tip body 50 has four ink flow grooves 64 disposed at equal angular intervals along the circumferential direction dc.

The rear hole 57 is located rearward of the ball holding chamber 52 and extends along the axial direction da. The rear hole 57 communicates with the ink storage cylinder 32 through the tip holder 34, and functions as a flow path of the ink from the ink storage cylinder 32 toward the ball holding chamber 52. The rear hole 57 is configured by a hole formed forward from the rear end of the tip body 50. The rear hole 57 includes a hole formed in a columnar shape. The central axis of the rear hole 57 coincides with the central axis A of the tip body 50.

In the present embodiment, the rear hole 57 includes a plurality of cylindrical holes 57a having different diameters. In particular, the diameter of each hole 57a configuring the rear hole 57 increases as it goes rearward. The central axis of each hole 57a coincides with the central axis A of the tip body 50. When the rear hole 57 includes a plurality of holes 57a having different diameters, a hole located foremost among the plurality of holes 57a is set as the foremost hole 57a1. When the rear hole 57 includes only one hole 57a, the hole 57a is set as the foremost hole 57a1. The ink flow hole 62 and the foremost hole 57a1 are coupled to each other by the inclined surface 158 of which a diameter increases as it goes rearward. In addition, two holes 57a adjacent to each other in the axial direction da are also coupled to each other by the inclined surface 158 of which a diameter increases as it goes rearward. The inclined surface 158 is configured as a side surface of a truncated cone having a central axis coincident with the central axis A of the tip body 50. An inclination angle θ of the inclined surface 158 with respect to the central axis A in the cross section including the central axis A can be set to, for example, 30 degrees or more and 60 degrees or less, and preferably 40 degrees or more and 50 degrees or less.

In the present embodiment, the diameter D2 of the foremost hole 57a1 is the smallest among the diameters of the holes 57a configuring the rear hole 57. The diameter D2 can be set to, for example, 0.3 mm or more and 1 mm or less. Preferably, the diameter D2 can be set to 0.4 mm or more and 0.8 mm or less. The distance R2 from the central axis A of the tip body 50 to the peripheral wall 159 of the foremost hole 57a1 coincides with the radius of the foremost hole 57a1, that is, is ½ of the diameter D2.

As described above, in the conventional ballpoint pen, the amount of ink forming the handwriting cannot be sufficiently increased, and the handwriting concentration formed by the ballpoint pen cannot be improved. As a result of intensive studies by the present inventors on a solution to this problem, it has been found that the amount of the ink supplied from the rear hole 57 to the ball 42 can be increased by improving the flow of the ink from the rear hole 57 to the ink flow groove 64, and thus the amount of the ink forming the handwriting can be increased. Specifically, the inventors have found that, by setting the ratio (R1/R2) of the distance R1 from the central axis A of the tip body 50 to the peripheral wall 66 of the ink flow groove 64 to the distance R2 from the central axis A to the peripheral wall 159 of the foremost hole 57a1 to 0.9 or more, the flow of the ink from the rear hole 57 to the ink flow groove 64 can be improved.

The present inventors presume that this is because of the following mechanism. When R1/R2 is less than 0.9, a step formed between the peripheral wall 66 of the ink flow groove 64 and the peripheral wall 159 of the foremost hole 57a1 increases. In particular, the dimension of the step in the radial direction dr increases. This step may inhibit the flow of the ink in the axial direction da. Specifically, the ink flowing from the foremost hole 57a1 toward the ink flow groove 64 collides with the step formed between the peripheral wall 66 and the peripheral wall 159, so that the flow of the ink is inhibited. On the other hand, when R1/R2 is 0.9 or more as in the present embodiment, the step formed between the peripheral wall 66 of the ink flow groove 64 and the peripheral wall 159 of the foremost hole 57a1 is reduced. That is, the dimension of the step in the radial direction dr decreases. Therefore, it is possible to effectively suppress the flow of the ink flowing from the foremost hole 57a1 toward the ink flow groove 64 from being inhibited by the step formed between the peripheral wall 66 and the peripheral wall 159.

Preferably, R1/R2 can be set to 0.95 or more. In addition, preferably, R1/R2 can be set to less than 1.0. When R1/R2 is such a value, it is possible to more effectively suppress the flow of the ink flowing from the foremost hole 57a1 toward the ink flow groove 64 from being inhibited by the step formed between the peripheral wall 66 and the peripheral wall 159.

In addition, in the present embodiment, the diameter D3 of the ball holding chamber 52 can be set to, for example, 100% or more and 120% or less of the diameter of the ball 42. Preferably, the diameter D3 can be set to more than 100% and 120% or less of the diameter of the ball 42. More preferably, the diameter D3 can be set to 105% or more and 110% or less of the diameter of the ball 42. In addition, the diameter D3 can be set to, for example, 0.15 mm or more and 0.6 mm or less. Preferably, the diameter D3 can be set to 0.15 mm or more and 0.4 mm or less. The distance R3 from the central axis A of the tip body 50 to the peripheral wall of the ball holding chamber 52 coincides with the radius of the ball holding chamber 52, that is, is ½ of the diameter D3.

As described above, by setting the ratio (R1/R3) of the distance R1 to the distance R3 to 0.9 or more in addition to setting the ratio (R1/R2) of the distance R1 to the distance R2 to 0.9 or more, the flow of the ink from the rear hole 57 to the ink flow groove 64 and further to the ball holding chamber 52 can be improved.

Figure 9:
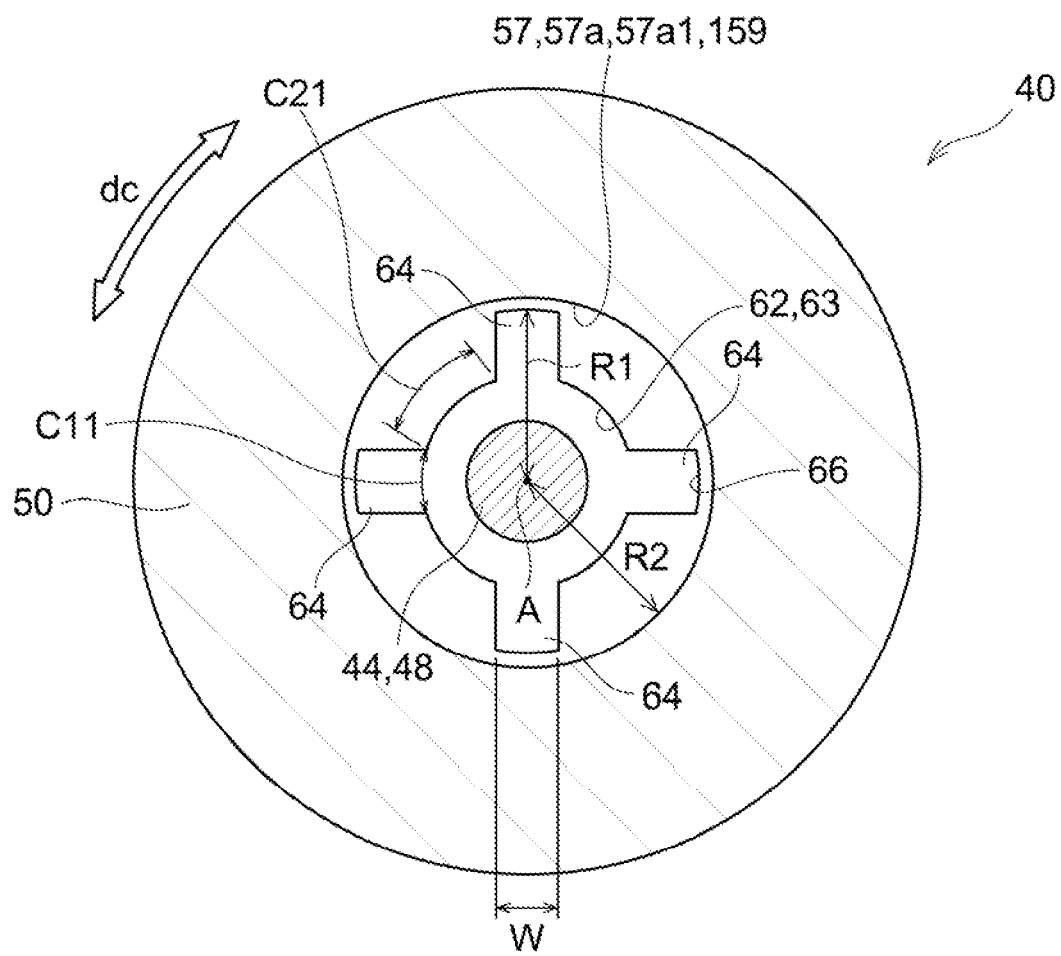
FIG. 9 is a transverse sectional view taken along line IX-IX in FIG. 8.

FIG. 9 is a transverse sectional view corresponding to the line IX-IX in FIG. 8, and is a view illustrating the ballpoint pen tip 40 in a cross section orthogonal to the central axis A of the tip body 50.

As described above, the peripheral wall 63 of the ink flow hole 62 has a cylindrical shape. Therefore, in the cross section illustrated in FIG. 9, the peripheral wall 63 has a circular shape. In the present specification, a length along the circumferential direction dc is referred to as a circumferential length. In the illustrated example, a circumferential length of a portion of the peripheral wall 63 of the ink flow hole 62 where one ink flow groove 64 is formed is set as C11. The circumferential length C11 is a length along the circumferential direction dc when it is assumed that the peripheral wall 63 is extended while maintaining its curvature at the portion where the ink flow groove 64 is formed. In the illustrated example, four ink flow grooves 64 having the same dimension are arranged at equal angular intervals in the circumferential direction dc. In this case, a sum C1 of circumferential lengths of the portions where the ink flow groove 64 is formed in the peripheral wall 63 of the ink flow hole 62 is four times as large as C11. In addition, a circumferential length of the peripheral wall 63 located between the two ink flow grooves 64 adjacent in the circumferential direction dc is set as C21. In this case, the sum C2 of the circumferential lengths of the portions where the ink flow groove 64 is not formed in the peripheral wall 63 of the ink flow hole 62 is four times as large as C21.

In the present embodiment, the ratio (C1/C2) of C1 to C2 is 0.5 or more. As a result, the cross-sectional area of the ink flow groove 64 can be increased. Therefore, a sufficient flow rate of the ink from the rear hole 57 toward the ball holding chamber 52 can be secured. In addition, C1/C2 can be set to 10 or less.

A ballpoint pen tip 40 according to the present embodiment includes: a ball 42, and a tip body 50 that holds the ball 42, the tip body 50 has a ball holding chamber 52 that holds the ball 42, a rear hole 57 located rearward of the ball holding chamber 52, an ink flow hole 62 that allows the ball holding chamber 52 and the rear hole 57 to communicate with each other, and an ink flow groove 64 extending in a radial direction dr from the ink flow hole 62, opening to the ball holding chamber 52, and reaching the rear hole 57, the rear hole 57 includes a foremost hole 57a1 located foremost, and a ratio (R1/R2) of a distance R1 from a central axis A of the tip body 50 to a peripheral wall 66 of the ink flow groove 64 to a distance R2 from the central axis A to a peripheral wall 159 of the foremost hole 57a1 is 0.9 or more.

The ballpoint pen refill 30 of the present embodiment includes the ballpoint pen tip 40 described above and an ink storage cylinder 32 that stores an ink.

The ballpoint pen 10 of the present embodiment includes the ballpoint pen refill 30 described above.

According to such a ballpoint pen tip 40, a ballpoint pen refill 30, and a ballpoint pen 10, since the step formed between the peripheral wall 66 of the ink flow groove 64 and the peripheral wall 159 of the rear hole 57 is reduced, the flow of the ink flowing from the rear hole 57 toward the ink flow groove 64 can be effectively suppressed from being inhibited by the step formed between the peripheral wall 66 and the peripheral wall 159. Therefore, in the ballpoint pen tip 40, the flow of the ink from the rear hole 57 to the ink flow groove 64 can be improved.

In addition, in a conventional ballpoint pen, when the ballpoint pen is left for a long period of time without writing, an ink may be dried and solidified in a ball holding chamber. In this case, the ink is not appropriately supplied to the ball, and there have been problems that handwriting is blurred, writing cannot be performed at all, and the like. According to the ballpoint pen tip the ballpoint pen refill 30, and the ballpoint pen 10 of the present embodiment, it is possible to increase the flow rate of the ink from the rear hole 57 to the ball holding chamber 52 by improving the flow of the ink from the rear hole 57 to the ink flow groove 64 in the ballpoint pen tip 40. As a result, drying of the ink in the ball holding chamber 52 can be effectively suppressed.

In the ballpoint pen tip 40 of the present embodiment, the ratio (C1/C2) of the sum C1 of the circumferential lengths of the portions where the ink flow groove 64 is formed in the peripheral wall 63 of the ink flow hole 62 to the sum C2 of the circumferential lengths of the portions where the ink flow groove 64 is not formed in the peripheral wall 63 of the ink flow hole 62 is 0.5 or more.

According to such a ballpoint pen tip 40, since the cross-sectional area of the ink flow groove 64 can be increased, the flow rate of the ink from the rear hole 57 toward the ball holding chamber 52 can be sufficiently secured. Therefore, in the ballpoint pen tip 40, the flow of the ink from the rear hole 57 to the ink flow groove 64 can be further improved.

In the ballpoint pen tip 40 of the present embodiment, the movable range C of the ball 42 in the front-rear direction with respect to the tip body is 0.015 mm or more and 0.06 mm or less.

When the ball 42 has such a movable range C, a gap that can be generated between the ball 42 and the crimped portion 56 becomes relatively large, and the ink in the ball holding chamber 52 is easily dried. Therefore, in such a ballpoint pen tip 40, the effect of suppressing drying of the ink in the ball holding chamber 52 by improving the flow of the ink from the rear hole 57 to the ink flow groove 64 is greatly exhibited.

As described above, the surface roughness of the inner surface of the tip body 50 is preferably 10 nm or more and 500 nm or less in the arithmetic average roughness Ra defined in JIS B0601: 2013. In particular, the surface roughness of the surface connected to the ink flow groove 64 is preferably 10 nm or more and 500 nm or less, more preferably 50 nm or more and 300 nm or less, and still more preferably 100 nm or more and 150 nm or less in the arithmetic average roughness Ra defined in JIS B0601: 2013. As a result, the flow of the ink to the ink flow groove 64 is improved. The surface connected to the ink flow groove 64 is at least one of an inner surface configuring the ink flow hole 62 and an inner surface configuring the rear hole 57.

Preferred aspects of the present embodiment will be described below.

[Supplementary Note 1]

A ballpoint pen tip including: a ball; and a tip body that holds the ball, in which the tip body has a ball holding chamber that holds the ball, a rear hole located rearward of the ball holding chamber, an ink flow hole that allows the ball holding chamber and the rear hole to communicate with each other, and an ink flow groove extending in a radial direction from the ink flow hole, opening to the ball holding chamber, and reaching the rear hole, the rear hole includes a foremost hole located foremost, and a ratio (R1/R2) of a distance R1 from a central axis of the tip body to a peripheral wall of the ink flow groove to a distance R2 from the central axis to a peripheral wall of the foremost hole is 0.9 or more.

[Supplementary Note 2]

The ballpoint pen tip according to supplementary note 1, in which a ratio (C1/C2) of a sum C1 of circumferential lengths of portions where the ink flow groove is formed in the peripheral wall of the ink flow hole to a sum C2 of circumferential lengths of portions where the ink flow groove is not formed in the peripheral wall of the ink flow hole is 0.5 or more.

[Supplementary Note 3]

The ballpoint pen tip according to supplementary note 1 or 2, in which a movable range of the ball in a front-rear direction with respect to the tip body is 0.015 mm or more and 0.05 mm or less.

[Supplementary Note 4]

A ballpoint pen refill including:
the ballpoint pen tip according to any one of supplementary notes 1 to 3; and
an ink storage cylinder that stores an ink.

[Supplementary Note 5]

The ballpoint pen refill according to supplementary note 4, in which the ink is a thermochromic ink.

[Supplementary Note 6]

A ballpoint pen including the ballpoint pen refill according to supplementary note 4 or 5.

The invention claimed is:

1. A ballpoint pen tip comprising: a ball having a diameter of 0.5 mm or less; and a tip body that holds the ball, wherein
the tip body has
a ball holding chamber that holds the ball,
a rear hole located rearward of the ball holding chamber,
an ink flow hole that allows the ball holding chamber and the rear hole to communicate with each other, and
an ink flow groove extending in a radial direction from the ink flow hole, opening to the ball holding chamber, and not reaching the rear hole,
when an ink consumption per 100 m of handwriting is A (mg) and the diameter of the ball is B (mm), a ratio (A/B) of the ink consumption A to the diameter B of the ball is 200 mg/mm or more and 800 mg/mm or less,
when a front end of the ink flow groove is set as a start point and a position of 0.3 mm rearward from the front end of the ink flow hole is set as an end point, a volume of a space in the ink flow hole and the ink flow groove from the start point to the end point is 0.02 mm³ or more, and
the volume of the space in the ink flow hole and the ink flow groove from the start point to the end point is 1.5 times or more a volume of a space in the ball holding chamber from a tip end of the tip body to the start point.

2. The ballpoint pen tip according to claim 1, wherein an inner diameter of the ink flow hole is 40% or more of the diameter of the ball.

3. The ballpoint pen tip according to claim 1, wherein a length of the ink flow hole is 90% or less of the diameter of the ball.

4. The ballpoint pen tip according to claim 1, wherein a length of a region where the ink flow groove is not formed in the ink flow hole is 90% or less of the diameter of the ball.

5. The ballpoint pen tip according to claim 1, further comprising a resilient member having a spring portion and a rod portion extending forward from the spring portion and coming into contact with the ball from the rear.

6. The ballpoint pen tip according to claim 1, wherein a movable range of the ball in a front-rear direction with respect to the tip body is 0.015 mm or more and 0.06 mm or less.

7. A ballpoint pen refill comprising:
the ballpoint pen tip according to claim 1; and
an ink storage cylinder that stores an ink.

8. The ballpoint pen refill according to claim 7, wherein the ink is a thermochromic ink.

9. A ballpoint pen comprising the ballpoint pen refill according to claim 7.

* * * * *